US007821670B2

(12) United States Patent
Nakaya et al.

(10) Patent No.: US 7,821,670 B2
(45) Date of Patent: Oct. 26, 2010

(54) IMAGE PROCESSING APPARATUS, IMAGE READING APPARATUS, IMAGE FORMING APPARATUS, AND METHODS THEREFOR

(75) Inventors: Fumio Nakaya, Kanagawa (JP); Hirokazu Ichikawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 685 days.

(21) Appl. No.: 11/802,103

(22) Filed: May 18, 2007

(65) Prior Publication Data

US 2008/0137154 A1 Jun. 12, 2008

(30) Foreign Application Priority Data

Dec. 7, 2006 (JP) .............................. 2006-330575

(51) Int. Cl.
*G06F 15/00* (2006.01)

(52) U.S. Cl. ...................... 358/1.9; 358/474; 358/504; 358/518; 358/520; 382/162; 382/167; 382/191; 250/226

(58) Field of Classification Search ....................... None
See application file for complete search history.

(56) References Cited

U.S. PATENT DOCUMENTS

| 5,589,954 | A | * | 12/1996 | Watanabe | 358/518 |
| 5,893,650 | A | * | 4/1999 | Ohmura | 396/51 |
| 6,856,354 | B1 | * | 2/2005 | Ohsawa | 348/370 |
| 7,531,789 | B2 | * | 5/2009 | Nakaya et al. | 250/226 |
| 2004/0090640 | A1 | * | 5/2004 | Nino et al. | 358/1.9 |
| 2005/0018223 | A1 | * | 1/2005 | Debevec et al. | 358/1.9 |
| 2006/0061841 | A1 | * | 3/2006 | Osawa et al. | 358/518 |

FOREIGN PATENT DOCUMENTS

| JP | 61-84150 | 4/1986 |
| JP | 5-110767 | 4/1993 |
| KR | 100120581 | 8/1997 |

* cited by examiner

*Primary Examiner*—Edward L Coles
*Assistant Examiner*—Miya J Cato
(74) *Attorney, Agent, or Firm*—Morgan, Lewis & Bockius LLP

(57) ABSTRACT

An image processing apparatus comprises: a first calculation section that calculates a plurality of spectral reflectances at a plurality of wavelengths based on intensities of light irradiating an object and reflected from the object, the light having a certain spectral energy distribution; a second calculation section that calculates color descriptor values of the object based on the spectral reflectances calculated by the first calculation section; a third calculation section that calculates a set of factors when the color descriptor values are expressed using a linear combination of a predetermined plurality of eigenvectors, factors associated with the respective eigenvectors, and either spectral energy of a reference light or theoretical spectral energy of a virtual light; and an output section that outputs the factors calculated by the third calculation section.

10 Claims, 9 Drawing Sheets

IMAGE PROCESSING APPARATUS, IMAGE READING APPARATUS, IMAGE FORMING APPARATUS, AND METHODS THEREFOR

CROSS-REFERENCE TO RELATED APPLICATIONS

This application is based on and claims priority under 35 USC 119 from Japanese Patent Application No. 2006-330575 filed on Dec. 7, 2006.

BACKGROUND

1. Technical Field

The present invention relates to an image processing apparatus, an image reading apparatus, and an image forming apparatus.

2. Related Art

When an object is read by an image forming apparatus including a scanning device, the object is illuminated with light while detecting light reflected from the original in wavelength regions of three colors, i.e. red, green, and blue, using line sensors or other photodetectors. Multi-valued image data made up of color components of four colors, i.e. yellow, magenta, cyan, and black, is then produced using predetermined image processing including obtaining spectral reflectances in each wavelength region. Because the number of colors expressed by combinations of the spectral reflectances of the wavelength regions increases with the increase in the number of wavelength regions that can be detected by the photodetectors, it is possible to form images faithfully reproducing the color of the objects. Accordingly, a demand has arisen for technologies permitting detection of light reflected from an object in a greater number of wavelength regions, i.e. reading an object in a greater number of colors.

SUMMARY

According to an aspect of the invention, there is provided an image processing apparatus a including: a first calculation section that calculates a plurality of spectral reflectances at a plurality of wavelengths based on intensities of light illuminating an object and reflected from the object, the light having a certain spectral energy distribution; a second calculation section that calculates color descriptor values of the object based on the spectral reflectances calculated by the first calculation section; a third calculation section that calculates a set of factors when a color of the object is expressed using a set of color descriptor values generated based on the color descriptor values calculated by the second calculation section, each of the set of the color descriptor values expressed by a linear combination of a plurality of eigenvectors, the factors each associated with the respective eigenvectors, and either spectral energy of a reference light from a light source or theoretical spectral energy of a virtual light; an output section that outputs the factors calculated by the third calculation section.

BRIEF DESCRIPTION OF THE DRAWINGS

Exemplary embodiments of the present invention will be described in detail based on the following figures, wherein.

DETAILED DESCRIPTION

The best mode for carrying out the present invention is explained below. It should be noted that an object O described below is not limited to sheet-like shapes, such as paper and OHP sheets, and may be of any shape. In addition, the visible light range roughly corresponds to a range of wavelengths from 400 nm to 700 nm.

(1) First Exemplary Embodiment

Figure 1:
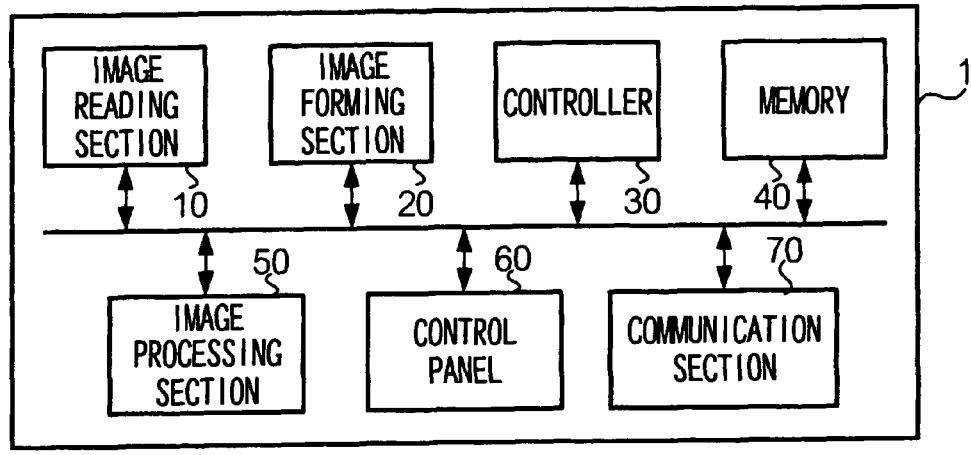
FIG. 1 is a block diagram illustrating the hardware configuration of an image forming apparatus according to a first exemplary embodiment of the present invention.

FIG. 1 is a block diagram illustrating the functional configuration of an image forming apparatus 1 of the present exemplary embodiment. The image forming apparatus 1 includes an image reading section 10, which reads images from printed matter etc., an image forming section 20, which forms images on a printing sheet (medium) in accordance with image data, a controller 30, which is an arithmetic unit including a CPU (Central Processing Unit), a RAM (Random Access Memory), and a ROM (Read Only Memory), etc., a memory 40, such as an HD (hard disk), which stores various data and programs describing operating procedures carried out by the controller 30, an image processing section 50, which carries out image processing on image data, a control panel 60, which includes various buttons or a touch panel-type liquid crystal display, and a communication section 70 serving as an interface device for performing communication through a network. More specifically, the image processing section 50 includes image processing circuitry, such as a set of ASIC (Application Specific Integrated Circuits), LSI (Large Scale Integration) circuits, etc., and an image memory for temporarily storing image data, with various types of image processing carried out by the respective image processing circuits.

Figure 2:
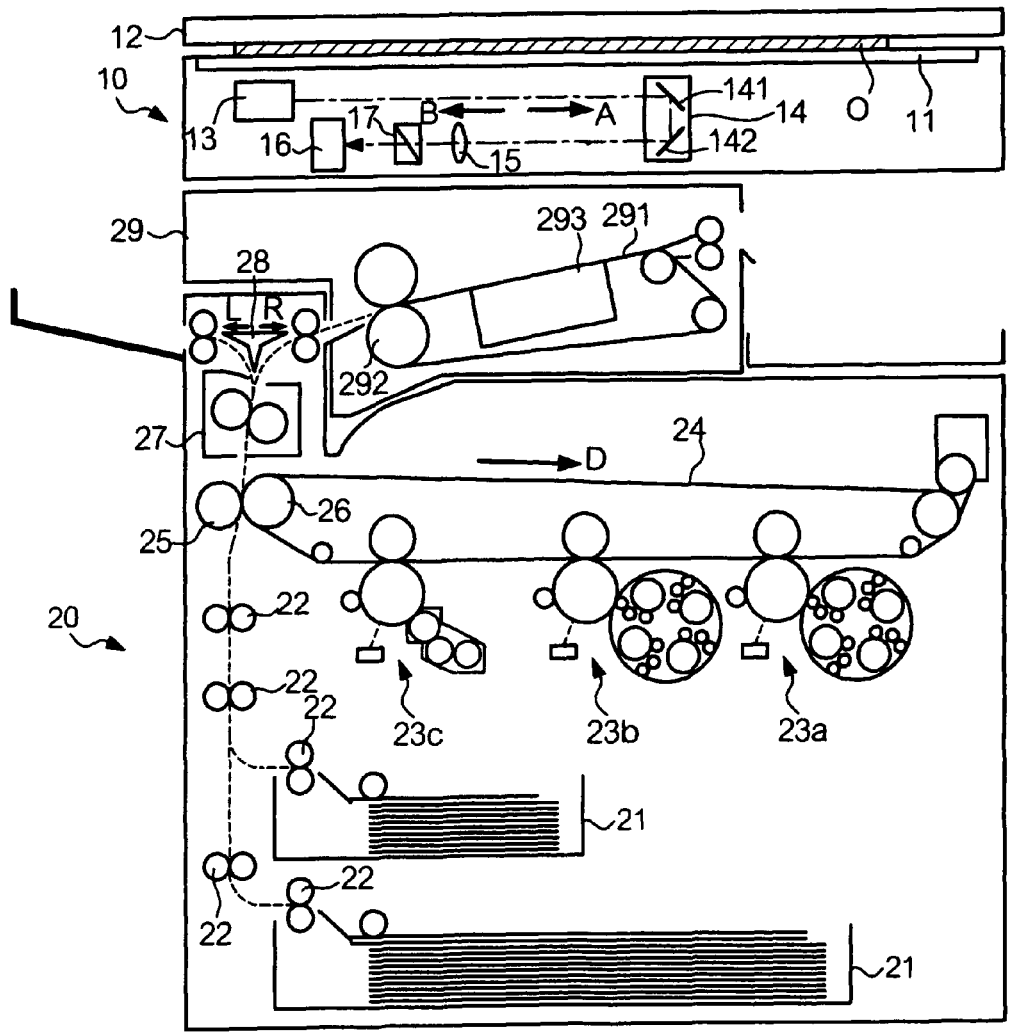
FIG. 2 is a diagram explaining the device configuration of the image forming apparatus according to the first exemplary embodiment.

FIG. 2 illustrates the device configuration of the image forming apparatus 1. Such an image forming apparatus 1 is generally divided into an image reading section 10, which reads objects and generates image data, and an image forming section 20, which forms toner images on printing paper and other printing materials in accordance with the image data.

The image reading section 10 operates as a so-called image scanner and the image forming section 20 operates as a so-called printer. Of these, the image reading section 10 includes a platen glass 11, a platen cover 12, a full-rate carriage 13, a half-rate carriage 14, an imaging lens 15, a line sensor 16, and a prism 17.

The platen glass 11 is a transparent glass plate, onto which objects O to be read are placed for subsequent reading. The platen glass 11 is arranged such that its surface is horizontal. Moreover, an antireflection layer, such as a multi-layer dielectric film etc., is formed on the surface of the platen glass 11 to reduce reflection from the surface of the platen glass 11. This is done in order to prevent images from being read in a state, where reflected light components originating from the surface of the object O, which are supposed to be read, are combined with unwanted reflected light components originating from the surface of the platen glass 11. It should be noted that by providing a spacer etc., the surface of the object O and the surface of platen glass 11 may be spaced apart in order to separate reflected light components originating from the object O and reflected light components originating from the surface of the platen glass 11.

The platen cover 12, which is provided so as to cover the platen glass 11, facilitates the reading of the object O placed on the platen glass 11 by shielding it from external light.

Detailed explanations are provided regarding the configuration of the above-mentioned full-rate carriage 13.

Figure 3:
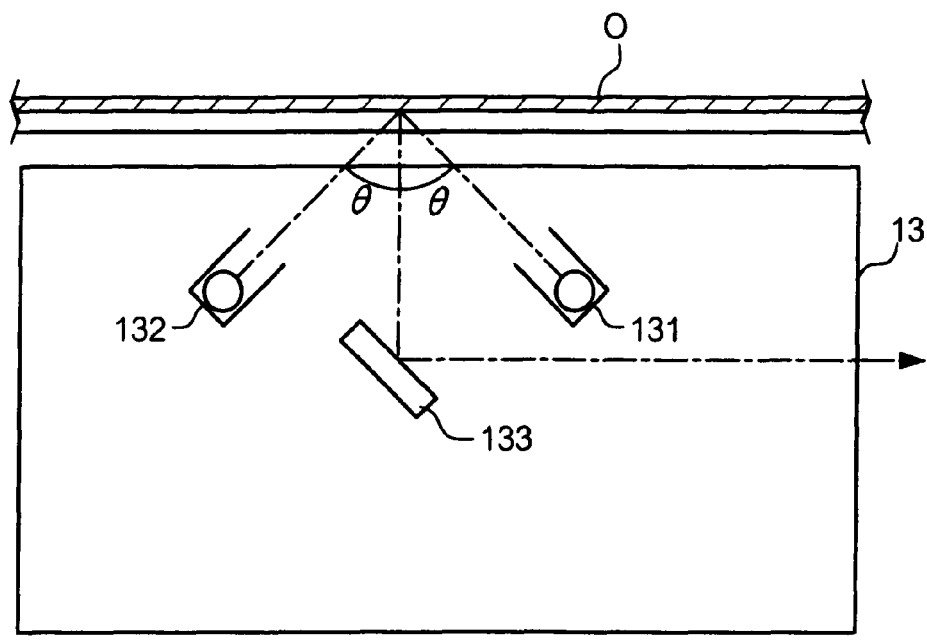
FIG. 3 is a diagram explaining the configuration of a full-rate carriage according to the first exemplary embodiment.

FIG. 3 shows the configuration of the full-rate carriage 13 in detail. As shown in FIG. 3, the full-rate carriage 13 includes a first light source 131, a second light source 132, and a mirror 133. The first light source 131 is a light source that emits a first illuminating light having a certain spectral energy distribution and the second light source 132 is a light source that emits a second illuminating light having a spectral energy distribution different from that of the first illuminating light. More specifically, the first light source 131 is a light source that emits light corresponding to standard illuminant $D_{65}$ and the second light source 132 is a light source that emits light corresponding to standard illuminant A.

Figure 4:
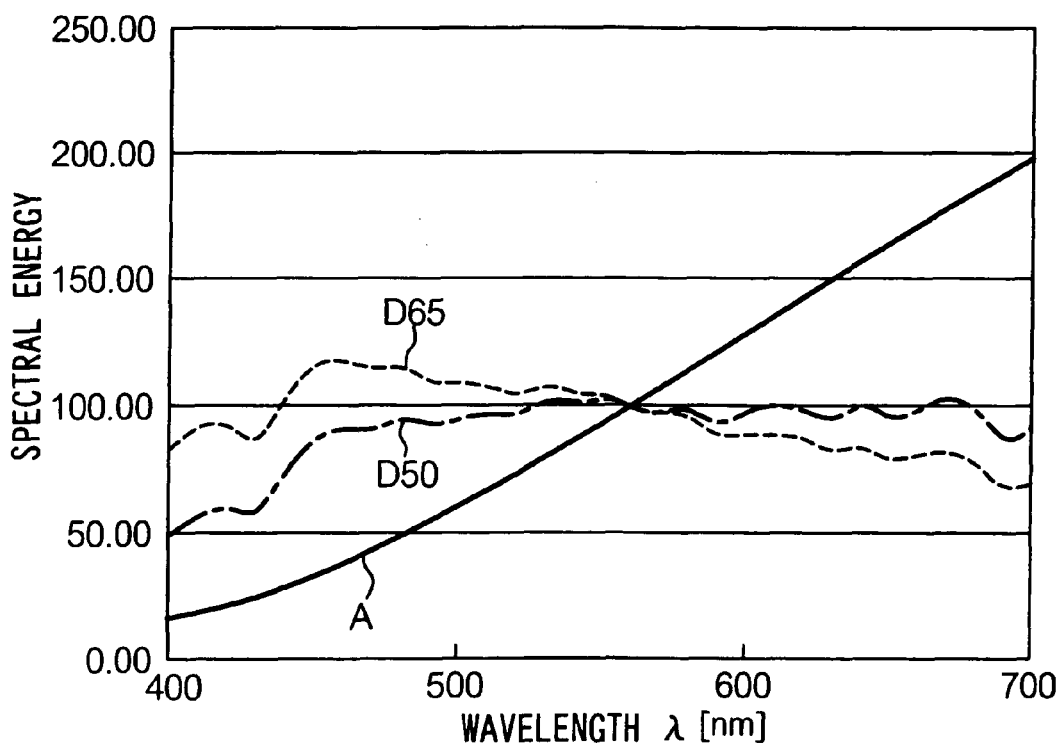
FIG. 4 is a diagram illustrating the spectral energy distribution of various light sources.

FIG. 4 illustrates the spectral energy distributions of the various light sources.

Illuminant $D_{65}$ is a type of light, produced when the state of a light source defined as a JIS standard is close to the color temperature of 6500K (Kelvin), and analogous to natural illumination out of direct sunlight or artificial daylight. As shown in FIG. 4, the spectral energy distribution of illuminant $D_{65}$ is generally uniform throughout the visible light range, i.e. from about 400 nm to about 700 nm. For this reason, illuminant $D_{65}$ is known to be commonly used for color evaluations. In the exemplary embodiments, a xenon lamp is used as a light source approximating illuminant $D_{65}$. Illuminant A, which refers to light from a light source having a color temperature of 2856K, is a type of light whose spectral energy increases in a linear fashion as the wavelength becomes longer in the visible light range. In the exemplary embodiments, a tungsten lamp is used as the source of such light A.

The first light source 131 and second light source 132 illuminate the object O at a predetermined angle of incidence (e.g. 45°) and intensity. The mirror 133 subjects light reflected from the object O to further reflection, forming an optical path (indicated with a dashed line in FIG. 3) that guides the light towards the half-rate carriage 14. During scanning, the full-rate carriage 13 moves in the direction of Arrows A or B in FIG. 2, scanning across the entire surface of the object O while illuminating it with light.

The half-rate carriage 14 includes mirrors 141 and 142 and forms an optical path guiding the light from the full-rate carriage 13 towards the imaging lens 15. In addition, the half-rate carriage 14 is driven by a driving mechanism, not shown, and, during scanning, is moved in the same direction as the full-rate carriage 13 at approximately half the speed of the full-rate carriage 13.

Figure 5:
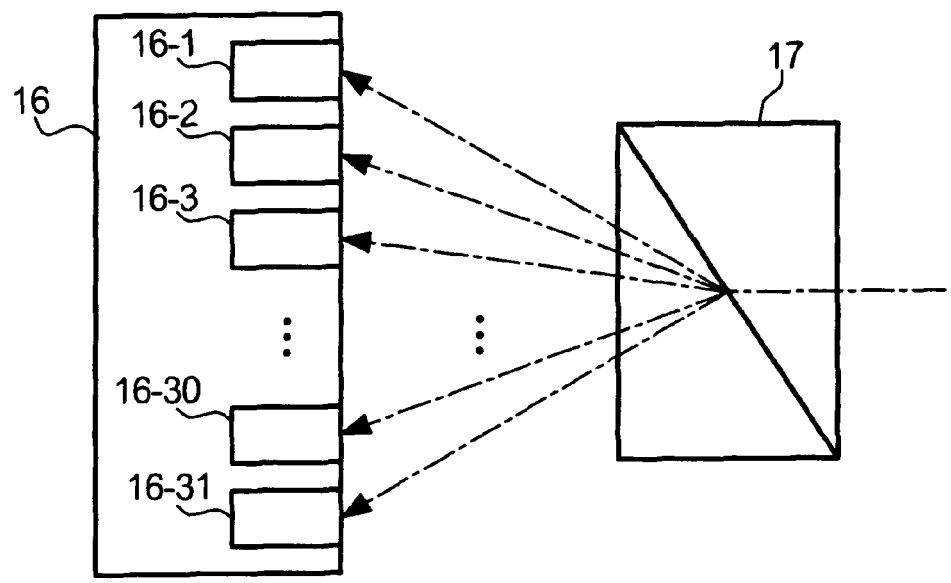
FIG. 5 is a diagram explaining the configuration of a line sensor and prism according to the first exemplary embodiment.

The imaging lens 15 and prism 17 are provided along an optical path connecting the mirror 142 to the line sensor 16 and focusing light originating from the object O on the line sensor 16. Here, FIG. 5 illustrates the configuration of the prism 17 and line sensor 16 in more detail. The line sensor 16 has, e.g. 31 photodetector lines: 16-1, 16-2, 16-3, ..., 16-30, and 16-31. When light reflected from a certain region of the object O reaches the location of the prism 17, the reflected light is split by the prism. Here, light belonging to the visible light range (400 nm to 700 nm) is assumed to be split at intervals of 10 nm. As a result, as shown by the arrows in FIG. 5, light reflected from the object O is split into a total of 31 wavelength regions, i.e. 400-410 nm, 410-420 nm, 420-430 nm, ..., 680-690 nm, and 690-700 nm. On the other hand, in accordance with the number of these wavelength regions, the line sensor 16 has 31 photodetector lines 16-1, 16-2, 16-3, ..., 16-30, and 16-31, whose detection sensitivities are adjusted according to the individual wavelength regions. In this manner, when light from each wavelength region produced by splitting in the prism 17 is incident on the respective photodetector lines 16-1, 16-2, 16-3, ..., 16-30, and 16-31 on the line sensor 16, the intensities of the individual portions of light are detected by the photodetector lines and image signals are generated in accordance with the intensities. These image signals are supplied to the image processing section 50.

The configuration of the image forming section 20 will now be explained. The image forming section 20 includes a set of paper feed trays 21, a set of transport rollers 22, primary transfer units 23a, 23b, and 23c, an intermediate transfer belt 24, a secondary transfer roller 25, a backup roller 26, a primary fixing mechanism 27, a changeover mechanism 28, and a secondary fixing mechanism 29.

The paper feed trays 21 hold sheets of predetermined sizes and supply the sheets for image forming. Although the term "sheets", as used here, typically means paper commonly used for image forming such as the so-called PPC (Plain Paper Copier) paper, etc., if necessary, sheets of materials other than printing paper and other paper, coated with resin etc. on the surface, can be used as well. The transport rollers 22 form a transport route transporting sheets supplied from the paper feed trays 21 to the location, where the backup roller 26 faces the secondary transfer roller 25. The term "sheet transport route" refers to the route indicated with a dashed line in FIG. 2. The primary transfer units 23a, 23b, and 23c form toner images corresponding to the supplied image data and transfer the formed toner images to the intermediate transfer belt 24.

Figure 6:
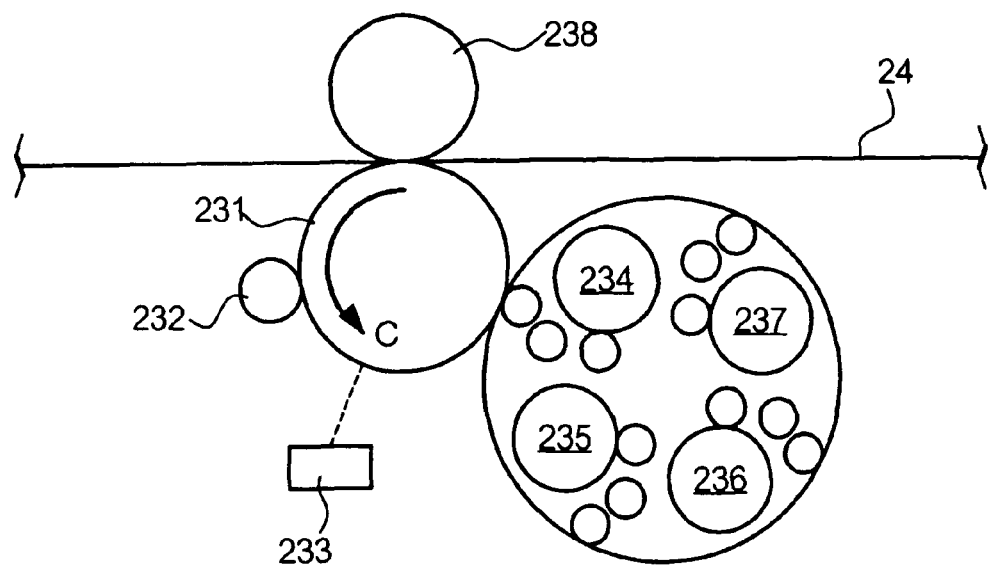
FIG. 6 is a diagram explaining the configuration of a developing mechanism according to the first exemplary embodiment.

The configuration of the primary transfer units 23a and 23b will be explained in more detail with reference to FIG. 6. It should be noted that the primary transfer units 23a and 23b differ only in terms of the toner they use and are identical in terms of configuration. Therefore, explanations are provided here by omitting the symbols (a) and (b) attached to the respective constituent elements.

The primary transfer units 23 include a photosensitive drum 231, an electrifier 232, an exposure device 233, developing units 234, 235, 236, and 237, and a primary transfer roller 238. The photosensitive drum 231, which is an image carrier having a photoconductive layer composed of OPC (Organic Photo Conductor: organic photoconductor) formed on its surface as a charge acceptor, is rotated in the direction of Arrow C in FIG. 6. The electrifier 232, which includes a charging roller, uniformly charges the surface of the photosensitive drum 231. The exposure device 233 illuminates the photosensitive drum 231 with light using a laser diode in order to form a latent electrostatic image of a predetermined potential on its surface. The developing units 234, 235, 236, and 237, along with holding toners of respectively different colors, form toner images by generating a predetermined electric potential difference (development bias) with respect to the surface of the photosensitive drum 231 and using this potential difference to cause the toner to adhere to the latent electrostatic images formed on the surface of the photosensitive drum 231. The developing units 234 to 237 form a so-called rotary type developing device. The primary transfer roller 238 generates a predetermined electric potential difference (primary transfer bias) at a location, where the intermediate transfer belt 24 faces the photosensitive drum 231, and transfers toner images to the surface of the intermediate transfer belt 24 using this potential difference. Moreover, the primary transfer unit 23c, which is a single-color developing unit, differs from the primary transfer units 23a and 23b only in terms of the number of toners it holds, with the rest of its operation being practically the same, and the corresponding explanations are therefore omitted.

The toners held in the developing units 234, 235, 236, and 237 include a total of 9 colors made up of the four colors of cyan, magenta, yellow, and black, the four colors of red, orange, green, and blue (the eight above-mentioned colors are called "color toners"), and a toner of a transparent color (referred to as "transparent toner" below).

The term "transparent toner" refers to a toner that does not contain colorants, for example, a toner produced by externally adding $SiO_2$ (silicon dioxide) and $TiO_2$ (titanium dioxide) to a polyester resin of a low molecular weight. Forming a toner image of transparent toner over the entire image has the effect of reducing height gradations resulting from differences in the amount of toner in different locations of the image and making irregularities on the surface of the image appear less prominent.

It should be noted that although these toners are held in the primary transfer units 23a, 23b, and 23c in appropriate locations depending on the frequency of use, etc., it is desirable for the transparent toner to be transferred before the color toners. This is done in order for the transparent toner to be transferred such that it covers the color toners on the sheet surface.

Referring back to FIG. 2, explanations will be provided regarding the rest of the constituent elements of the image forming section 20. The intermediate transfer belt 24 is an endless belt member driven in the direction of Arrow D in FIG. 2 by a driving mechanism, not shown. The intermediate transfer belt 24 has toner images transferred onto it (primary transfer) at the locations where the photosensitive drums 231a, 231b, and 231c face the intermediate transfer belt 24 and moves the images for transfer onto the sheet (secondary transfer). The secondary transfer roller 25 and backup roller 26 generate a predetermined electric potential difference (secondary transfer bias) at the location where the intermediate transfer belt 24 faces the sheet and transfer the toner images onto the sheet. The primary fixing mechanism 27, which includes roller members used for applying heat and pressure to the sheet, fixes the transferred toner image on the surface of the sheet. The changeover mechanism 28 varies the transport route of the sheet depending on the type of toner image formed on the surface of the sheet. Specifically, in FIG. 2, sheets with toner images containing transparent toner are transported by the changeover mechanism 28 in the direction of Arrow R in FIG. 2 and other sheets are transported and ejected in the direction of Arrow L in FIG. 2.

The secondary fixing mechanism 29 includes a fixing belt 291, a heater 292, and a heat sink 293. The secondary fixing mechanism 29 uses the heater 292 to apply additional heat to the sheet, which has already been subjected to heating and pressure in the primary fixing mechanism 27, and re-melts the toner once again. The secondary fixing mechanism 29 then uses the heat sink 293 to cool the sheet while the sheet is adhered to the fixing belt 291, which has a smooth surface, so as to fix the toner. Such fixing treatment makes it possible to form toner images with smooth, highly glossy surfaces.

The full-rate carriage 13 of the image reading section 10 reads (which is referred to as performing a "scanning operation" below) the object O by illuminating it with light from the first light source 131 or second light source 132. In particular, the scanning operation conducted by illuminating the object O with light from the first light source 131 is referred to as "a first scanning operation", with the image data generated thereby referred to as "first image data". Moreover, the scanning operation conducted by illuminating the object O with light from the second light source 132 is referred to as "a second scanning operation", with the image data generated thereby referred to as "second image data". In other words, the image reading section 10 executes two scanning operations, i.e. the first scanning operation and the second scanning operation. The image processing section 50 then generates the first and second image data from the individual image signals obtained during the scanning operations and calculates spectral reflectances from the image data.

In conventional image forming apparatus, spectral reflectances are handled as discrete values and not as continuous quantities. In other words, only a predetermined number (called extraction number below) of spectral reflectances for a certain wavelength region, contained in a predetermined wavelength region (e.g. the visible light region), is calculated (extracted). Thus, for all the image data, the spectral reflectance extraction number is (spectral reflectance extraction number per pixel)×(number of pixels). Below, a quantity (continuous quantity) that allows for obtaining estimate values by subjecting these "spectral reflectances" (discrete values) extracted from a certain wavelength region to regression analysis, is referred to as a "spectral reflectance estimation function".

If the spectral reflectance is captured as a continuous quantity as it is in nature, a curve can often be drawn, where a smooth change takes place following gradual changes in the wavelength. Thus, when spectral reflectances are extracted as discrete values, spectral reflectance can be represented with a sufficient level of accuracy if the wavelength interval $\delta=10$ nm. Moreover, the wavelength interval may sometimes be set to $\delta=5$ nm in order to achieve a more faithful reproduction of the color of the object. If the wavelength interval is set to $\delta=10$ nm and the wavelength region where spectral reflectances are extracted is 400 nm to 700 nm, 31 spectral reflectances will be extracted for each pixel. Although transmitting only three spectral reflectances per pixel through the signal line and bus is sufficient when using an image forming apparatus of the ordinary configuration because the object is read in three wavelength regions, i.e. R, G, and B, in this case it is necessary to transmit approximately 10 times more spectral reflectance data than usual through the signal line and bus. Therefore, transmitting the spectral reflectances as data requires considerable time.

Therefore, such transmission is carried out after reducing the amount of data generated by m spectral reflectances extracted at wavelength intervals of δ. More specifically, the m spectral reflectances are represented using a linear combination of n eigenvectors, where n is a smaller number. In other words, if factors associated with predetermined n eigenvectors are calculated, a spectral reflectance estimation function will be defined, and, therefore, the amount of data will be reduced. However, in order to reduce the amount of data in this manner, the spectral reflectance estimation function must be expressed using a relatively small number of eigenvectors. Moreover, in order to prevent the accuracy of the spectral reflectance estimation function from decreasing, spectral reflectances having various characteristics have to be represented by eigenvectors with relatively large contribution ratios.

As described above, spectral reflectance is a continuous quantity in nature, and there are many wavelength regions, where it is possible to draw a curve showing its smooth changes versus changes in wavelength. In other words, in many cases the spectral reflectances of adjacent wavelength regions have relatively close values. This is due to the fact that the characteristics of two kinds of light from adjacent wavelength regions are similar, and when these different kinds of light are used to illuminate an object, relatively close characteristics are exhibited in terms of the intensity of reflected light as well. Therefore, it can be said that there is a correlation between the spectral reflectance of a certain wavelength region and the spectral reflectance of another wavelength region. Thus, expressing the spectral reflectance estimation function using a smaller number of eigenvectors than the spectral reflectance extraction number can provide an effective method for reducing the amount of data.

The procedure used for calculating such an eigenvector-based spectral reflectance estimation function is explained below.

First of all, explanations are provided with respect to how eigenvectors are defined. Initially, a population is formed using spectral reflectances representing a huge number of colors, which are assumed to be contained in the object. The eigenvectors can then be defined by performing multivariate analysis (principal component analysis is used below) on such a population. Because the spectral reflectance estimation function for all colors is expressed using a linear combination of eigenvectors, the population is preferably constituted by as many spectral reflectances having dissimilar relationships between the wavelength and the spectral reflectance as possible. Forming the optimal spectral reflectance population in this manner provides a more reliable correlation between spectral reflectances in various wavelength regions.

With account taken of the above, a spectral reflectance estimation function of sufficient accuracy is obtained, for example, if the population is composed of spectral reflectances of approximately 500 to 1000 colors.

Figure 7:
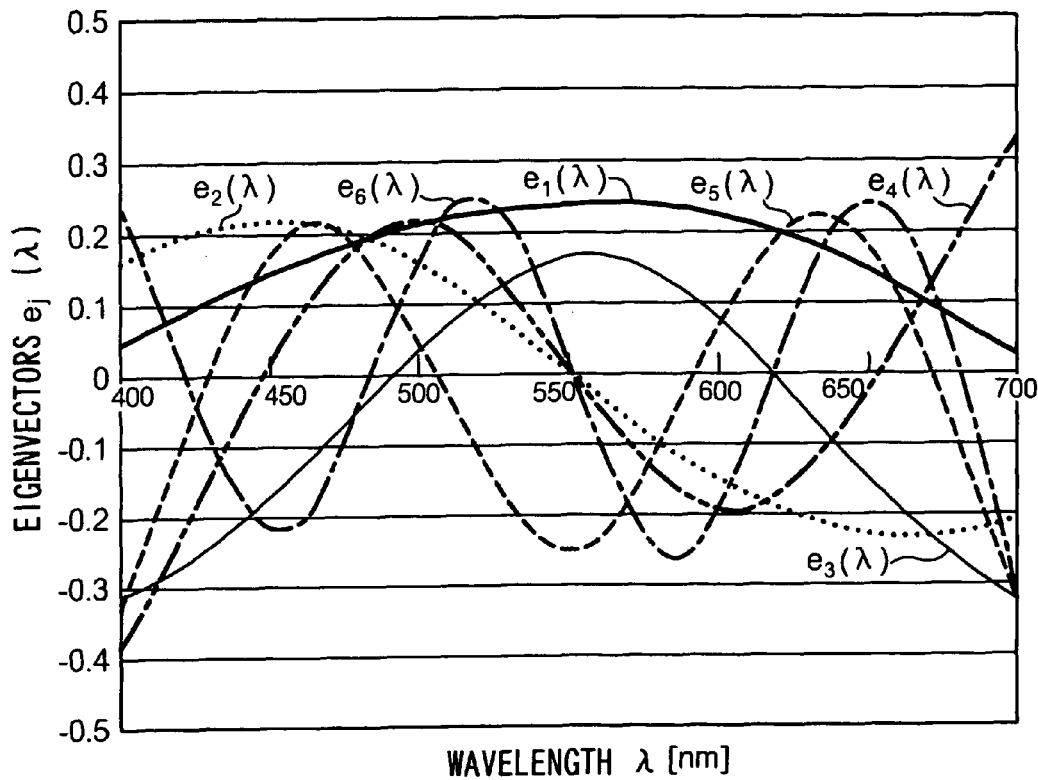
FIG. 7 is a diagram illustrating eigenvectors according to the first exemplary embodiment.

The eigenvectors are defined by performing principal component analysis upon the thus formed population. FIG. 7 illustrates eigenvectors defined on a population Σ. FIG. 7 shows, for individual wavelengths, the values of the eigenvectors $e_1(\lambda)$ to $e_6(\lambda)$ defined so as to express the spectral reflectance estimation function using six eigenvectors. It should be noted that while FIG. 7 illustrates a case, in which the eigenvectors are defined through principal component analysis for an arbitrary wavelength λ, the eigenvectors will have different characteristics if, for example, a different method is used for calculation during principal component analysis.

Figure 8:
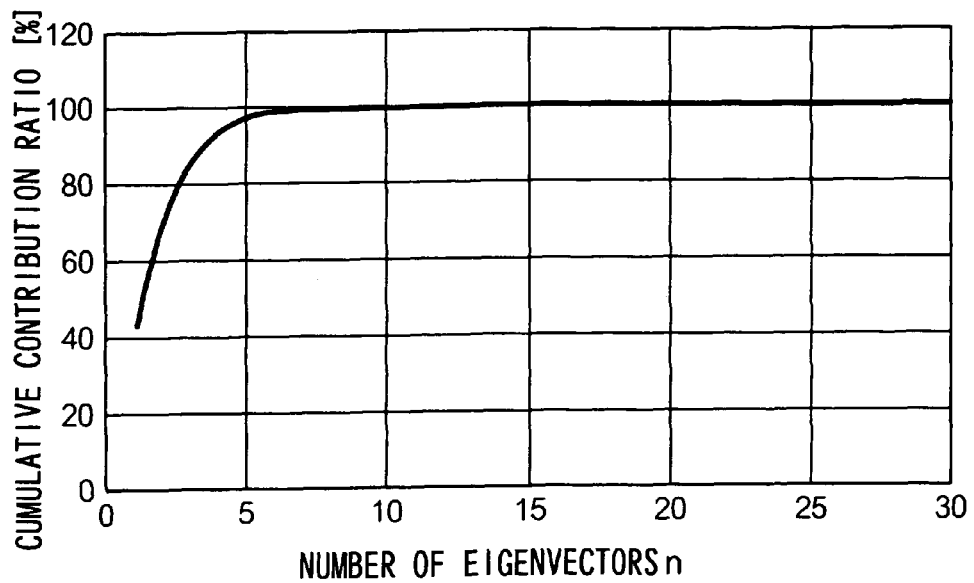
FIG. 8 is a diagram illustrating the relationship between the number of eigenvectors and the cumulative contribution ratio according to the first exemplary embodiment.

Moreover, although the number of eigenvectors $e_1(\lambda)$ to $e_6(\lambda)$ used in FIG. 7 is 6, their number is not limited to 6. FIG. 8 shows a relationship between the number of eigenvectors and the cumulative contribution ratio for the population Σ. Base on FIG. 8, it can be said that because the cumulative contribution ratio with respect to the population Σ increases with the increase in the number of eigenvectors, the larger the number of eigenvectors, the more desirable it is. However, because processing becomes more difficult and the time required for processing increases as the number of the eigenvectors grows, a number sufficient for calculating the spectral reflectance estimation function with a certain degree of accuracy is determined in advance. In the case illustrated in FIG. 8, if the number of the eigenvectors is set to 6, the cumulative contribution ratio with respect to the population Σ will be about 98%, which is sufficiently large for highly accurate calculation of the spectral reflectance estimation function of the population Σ. Moreover, if spectral reflectances not included in the population Σ include the spectral reflectances of colors possessing relatively small color differences in comparison with the colors expressed by said spectral reflectances, these spectral differences will often exhibit analogous characteristics and, therefore, the resultant accuracy of the spectral reflectance estimation function is sufficient.

Considering now the cumulative contribution ratio obtained when using 7 or more eigenvectors, the cumulative contribution ratio exhibits almost no increase and practically levels off. In other words, if more than a certain number of eigenvectors are used, only the amount of data increases, and there is virtually no improvement in the accuracy of the spectral reflectance estimation function. On the other hand, if the number of the eigenvectors is set to 5 or less, the amount of the data in the spectral reflectance estimation function is further reduced, but the cumulative contribution ratio with respect to the population Σ also rapidly decreases. For example, if the number of the eigenvectors is set to 2, the cumulative contribution ratio with respect to the population Σ will be about 60%, and the accuracy of the spectral reflectance estimation function will be somewhat insufficient even for spectral reflectances constituting the population Σ. Therefore, it is desirable to select the number of the eigenvectors while striking a balance between the cumulative contribution ratio with respect to a defined eigenvector population and the amount of data required therefore.

The relationship between the eigenvectors $e_j(\lambda)$ defined by performing principal component analysis upon a population Σ and the spectral reflectance estimation function $\rho(\lambda)$ represented thereby is shown in formula 1. Below, it is assumed that 31 (=m) spectral reflectances, obtained at wavelength intervals of δ=10 nm, are extracted from the first and second image data in the wavelength region of 400 nm to 700 nm. Also, the spectral reflectance estimation function $\rho(\lambda)$ is expressed using a linear combination of the six eigenvectors $e_1(\lambda)$ to $e_6(\lambda)$.

$$p(\lambda) = \sum_{j1}^{6} w_j e_j(\lambda) \tag{1}$$

In formula (1), factors $w_j$ (j=1 to 6) are factors associated with the eigenvectors $e_j(\lambda)$ necessary to the calculation of the spectral reflectance estimation function $\rho(\lambda)$.

Next, color descriptor values are determined based on the spectral reflectances extracted from the image data and factors $w_j$ (j=1 to 6) are calculated from the relationship between the color descriptor values and the spectral reflectance estimation function represented by formula (1). If the tristimulus values of the XYZ color system are used for the color descriptor values, the factors $w_j$ can be calculated using the following formulas (2) through (7). The following formulas (2) to (7) are known as the relational expressions between the spectral reflectances and the tristimulus values of the XYZ color system, with the values of the spectral reflectance estimation function $\rho(\lambda)$ used herein. Here, formulas (2) through (4) represent the relational expressions of the tristimulus values of standard illuminant $D_{65}$ and formulas (5) through (7) represent the relationships of the tristimulus values of standard illuminant A.

$$X_{D65} = \sum_{j=1}^{6} w_j \int_{vis} e_j(\lambda) \cdot E_{65}(\lambda) \cdot \bar{x}(\lambda) d\lambda. \tag{2}$$

$$Y_{D65} = \sum_{j=1}^{6} w_j \int_{vis} e_j(\lambda) \cdot E_{65}(\lambda) \cdot \bar{y}(\lambda) d\lambda. \tag{3}$$

$$Z_{D65} = \sum_{j=1}^{6} w_j \int_{vis} e_j(\lambda) \cdot E_{65}(\lambda) \cdot \bar{z}(\lambda) d\lambda. \tag{4}$$

$$X_A = \sum_{j=1}^{6} w_j \int_{vis} e_j(\lambda) \cdot E_A(\lambda) \cdot \bar{x}(\lambda) d\lambda. \tag{5}$$

$$Y_A = \sum_{j=1}^{6} w_j \int_{vis} e_j(\lambda) \cdot E_A(\lambda) \cdot \bar{y}(\lambda) d\lambda. \tag{6}$$

$$Z_A = \sum_{j=1}^{6} w_j \int_{vis} e_j(\lambda) \cdot E_A(\lambda) \cdot \bar{z}(\lambda) d\lambda. \tag{7}$$

It should be noted that formulas (2) through (4) express relationships between tristimulus values $X_{D65}$, $Y_{D65}$, and $Z_{D65}$ determined from the first image data and the values of the spectral reflectance estimation function $\rho(\lambda)$, and formulas (5) through (7) express relationships between the tristimulus values $X_A$, $Y_A$, and $Z_A$ determined from the second image data and the values of the spectral reflectance estimation function $\rho(\lambda)$. In addition, the word "vis" in formulas (2) to (7) represents the wavelength region where the spectral reflectances were extracted, which in this case is from 400 nm to 700 nm. Furthermore, $E_{65}(\lambda)$ is a formula that represents the spectral energy distribution of the first light source 131 and $E_A(\lambda)$ is a formula that represents the spectral energy distribution of the second light source 132. Moreover, in formulas (2) through (7), the functions expressed by the following formulas (8) through (10) (functions x(λ), y(λ), and z(λ), with bars over x, y, and z) are the respective color-matching functions for the X-, Y-, and Z-axis in the XYZ color system.

$$\bar{x}(\lambda) \tag{8}$$

$$\bar{y}(\lambda) \tag{9}$$

$$\bar{z}(\lambda) \tag{10}$$

When the respective 31 spectral reflectances are extracted from the first and second image data, the tristimulus values $X_{D65}$, $Y_{D65}$, $Z_{D65}$ and $X_A$, $Y_A$, $Z_A$ are determined for each individual spectral reflectance. At this point formulas (2) to (7) become $6^{th}$-order linear equations where the six factors $w_1$ to $w_6$ are the unknown values and, therefore, the unique values of the factors $w_1$ to $w_6$ can be calculated. Namely, because there are six factors $w_j$ as the unknown values, six different tristimulus values are obtained using two different light sources.

When the values of the factors $w_1$ to $w_6$ are calculated, the spectral reflectance estimation function $\rho(\lambda)$ is defined, and the image forming apparatus 1 can determine the color and amount of the toner required when forming images. Furthermore, since all the tristimulus values $X_{D65}$, $Y_{D65}$, $Z_{D65}$ and $X_A$, $Y_A$, and $Z_A$ have been determined, approximate colors can be obtained from these tristimulus values. For example, even if the user does not visually confirm the color of the image, the color can still be determined from the tristimulus values.

Figure 9:
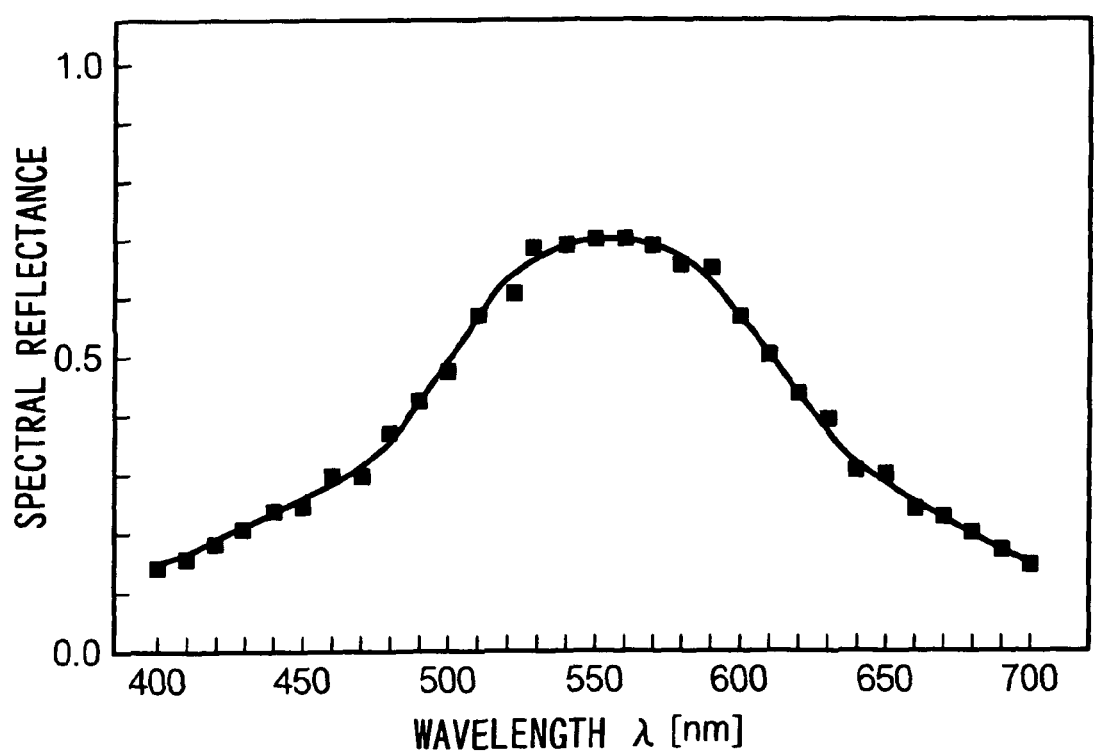
FIG. 9 is a diagram illustrating an exemplary spectral reflectance interpolation function according to the first exemplary embodiment.

FIG. 9 shows, for a given pixel, spectral reflectances extracted from the image data representing the object and an exemplary spectral reflectance estimation function $\rho(\lambda)$ expressed via the eigenvectors $e_1(\lambda)$ to $e_6(\lambda)$ illustrated in FIG. 7. FIG. 9 shows a plot of the 31 spectral reflectances (discrete values) extracted by setting the wavelength interval to δ=10 nm and shows a solid line representing the spectral reflectance estimation function $\rho(\lambda)$ (continuous quantity) obtained by expressing the spectral reflectances using the six eigenvectors $e_1(\lambda)$ to $e_6(\lambda)$. As can be seen from FIG. 9, the spectral reflectance estimation function $\rho(\lambda)$ is a smoothly changing curvilinear function and exhibits characteristics practically matching the original spectral reflectances. Namely, depending on how the eigenvectors are defined, the amount of data concerning the spectral reflectances may be reduced by 20% or so but the spectral reflectance estimation function will still be capable of representation with sufficient accuracy.

Details of operating procedures carried out by the image forming apparatus 1 will be explained next. It should be noted that a spectral reflectance estimation function $\rho(\lambda)$ is expressed using six eigenvectors $e_1(\lambda)$ to $e_6(\lambda)$, such as the ones shown in FIG. 7, which are defined on a population Σ.

Additionally, during the manufacturing step, either manually or using the image forming apparatus 1 itself, a population Σ constituted by the spectral reflectances of various colors assumed to be contained in the object is subjected to principal component analysis, thereby defining six eigenvectors $e_1(\lambda)$ to ~$e_6(\lambda)$. The defined eigenvectors $e_1(\lambda)$ to $e_6(\lambda)$ are stored in the internal memory of the image processing section 50.

Figure 10:
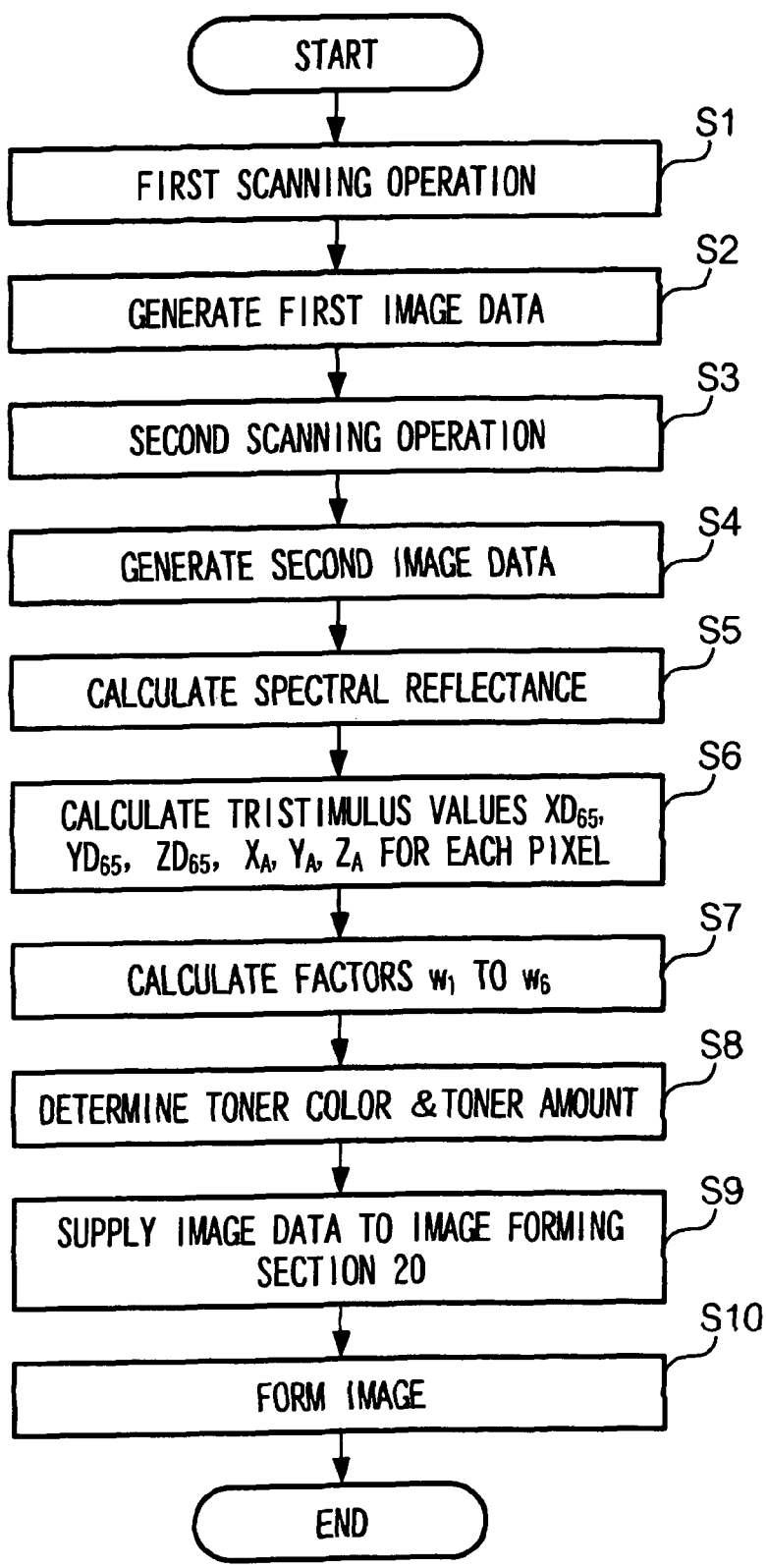
FIG. 10 is a flow chart illustrating the sequence of operations of the image forming apparatus according to the same exemplary embodiment.

FIG. 10 is a flow chart showing a sequence of operations that are carried out, in which the image forming apparatus 1 performs the operation of scanning the object O and forms an image on printing paper P.

When the object to be imaged O is placed on the platen glass 11 and the operator issues an instruction to start image forming, the controller 30 causes the image reading section 10 to execute the first scanning operation by illuminating the object to be imaged O with light from the first light source 131 (Step S1). The controller 30 then supplies the generated image signal to the image processing section 50, causing it to generate the first image data (Step S2). Subsequently, the controller 30 causes the image reading section 10 to execute the second scanning operation by illuminating the object O with light from the second light source 132 (Step S3). The controller 30 then supplies the generated image signal to the image processing section 50, causing it to generate the second image data (Step S4). After that, the controller 30 causes the image processing section 50 to calculate spectral reflectances for individual pixels forming part of the image data (Step S5). More specifically, 31 spectral reflectances are calculated per pixel by setting the wavelength interval to δ=10 nm in the wavelength region of from 400 nm to 700 nm.

Subsequently, the controller 30 causes the image processing section 50 to calculate the tristimulus values of the XYZ color system $X_{D65}$, $Y_{D65}$, $Z_{D65}$, and $X_A$, $Y_A$, $Z_A$ for each individual pixel of the first and second image data based on the spectral reflectances calculated in Step S5 (Step S6). The controller 30 then causes the image processing section 50 to calculate factors $w_1$ to $w_6$ in order to calculate the spectral reflectance estimation function $\rho(\lambda)$ for the image data representing the object O (Step S7).

Subsequently, the controller 30 causes the image processing section 50 to carry out color space processing and screen processing on the image data to determine the amount and color of the toner applied to areas corresponding to the pixels of the image data (Step S8).

When determining the amounts of the toners, the controller 30 identifies, for each pixel, the proportions of the toners (colorants) of each color, such as cyan, magenta, yellow, black, red, orange, green, and blue, area ratios, and dot shapes, etc. for the color represented by the spectral reflectance estimation function $\rho(\lambda)$, which is determined by the factors $w_1$ to $w_6$. Furthermore, depending on the image described by the image data, the controller 30 may determine whether to use transparent toner. For example, when the number of utilized toner colors is small, such as when the image data is monochromatic document data, etc., the controller 30 sets the toner amount for transparent toner to zero for such image data. Moreover, when the image data is polychromatic and the number of utilized toner colors increases, the controller 30 applies a predetermined amount of the transparent toner over the entire area of the image data.

The controller 30 supplies image data including information on the proportions of toner of each color in each pixel, area ratios and dots, etc. to the image forming section 20 (Step S9). In accordance with the image data, the image forming section 20 uses a set of toners to form an image on a printing sheet P (Step S10).

Specifically, the image forming section 20 selects the primary transfer units 23 corresponding to the image data of each color and forms latent electrostatic images corresponding to the image data therein. After that, the image forming section 20 selects the developing units of the toner color indicated by the image data (any one of 234 to 237) and applies toner to the latent electrostatic images to form toner images. Once the toner images of various colors have been formed by doing so and once the primary transfer thereof onto the intermediate transfer belt 24 has been carried out, the image forming section 20 carries out secondary transfer of the toner images onto the sheet, fixes the images using the primary fixing mechanism 27 and secondary fixing mechanism 29, and ejects the sheet. This produces a copy, which is an image representing the object O, and the image forming process is terminated.

According to the above-described exemplary embodiment, once a predetermined number of spectral reflectances have been calculated from the image data representing an object, the image forming apparatus 1 calculates a spectral reflectance estimation function using a smaller number of eigenvectors. Because the eigenvectors are defined by the spectral reflectances representing colors assumed to be present in an object, a given spectral reflectance estimation function is represented practically without any decrease in accuracy. Therefore, even if the amount of data is reduced to a greater extent than under conventional methods, the color of the object can still be faithfully reproduced.

The exemplary embodiment explained above is the first exemplary embodiment.

(2) Second Exemplary Embodiment

A second exemplary embodiment of the present invention is explained next.

In the second exemplary embodiment, an attempt is made to calculate the spectral reflectance estimation function even more accurately than in the above-described first exemplary embodiment.

Figure 11:
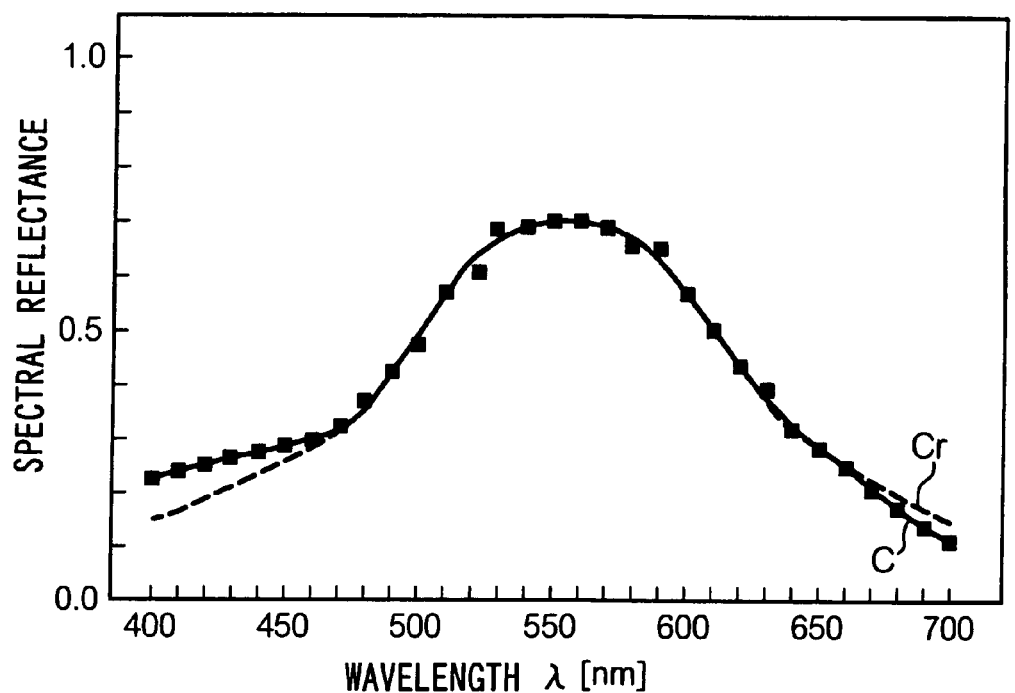
FIG. 11 is a diagram representing the interpolation function $\rho(\lambda)$ calculated by the method of the first exemplary embodiment and the original spectral reflectances of the object.

The solid line C of FIG. 11 represents a spectral reflectance estimation function $\rho_1(\lambda)$ calculated by the method of the first exemplary embodiment, and the dashed line Cr represents the original spectral reflectances of the object. As shown in FIG. 11, the difference between the calculated spectral reflectance estimation function and the original spectral reflectances of the object has relatively large values in the short-wavelength region (approximately 400 to 440 nm) and in the long-wavelength region (approximately 660 to 700 nm) of the wavelength range where the spectral reflectances were extracted.

Figure 12:
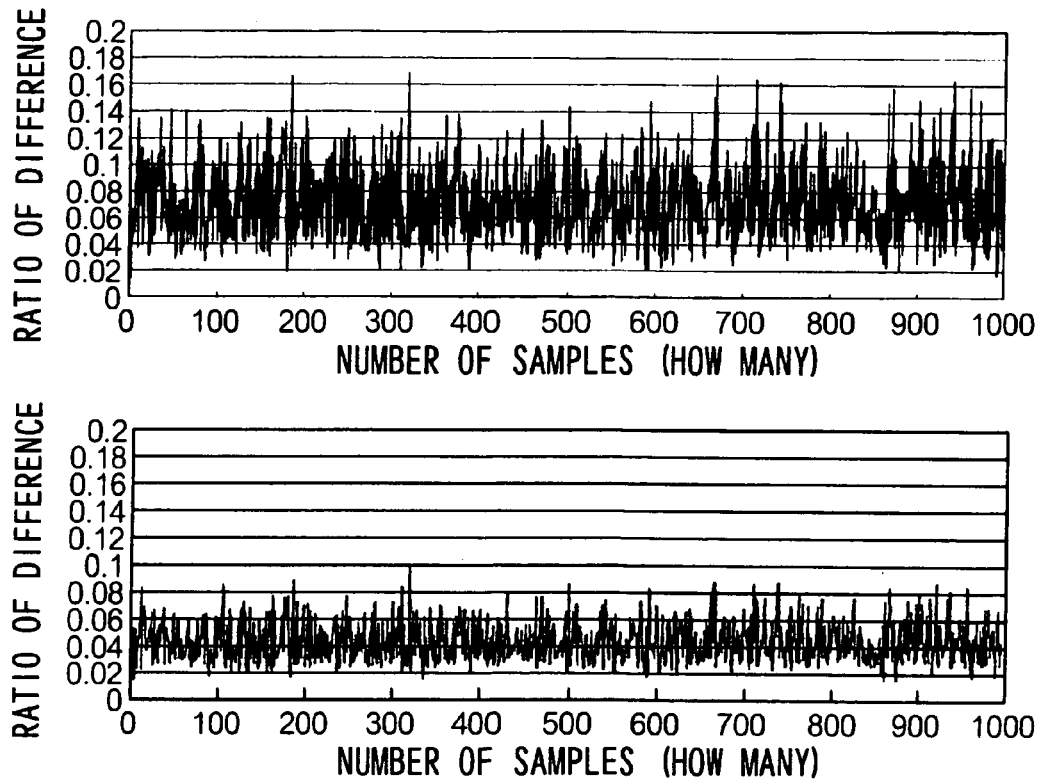
FIG. 12 is a diagram representing the result of obtaining, for 1,000 various objects, the difference between the spectral reflectances represented by the interpolation function $\rho(\lambda)$ and the original spectral reflectances of the object.
Figure 13:
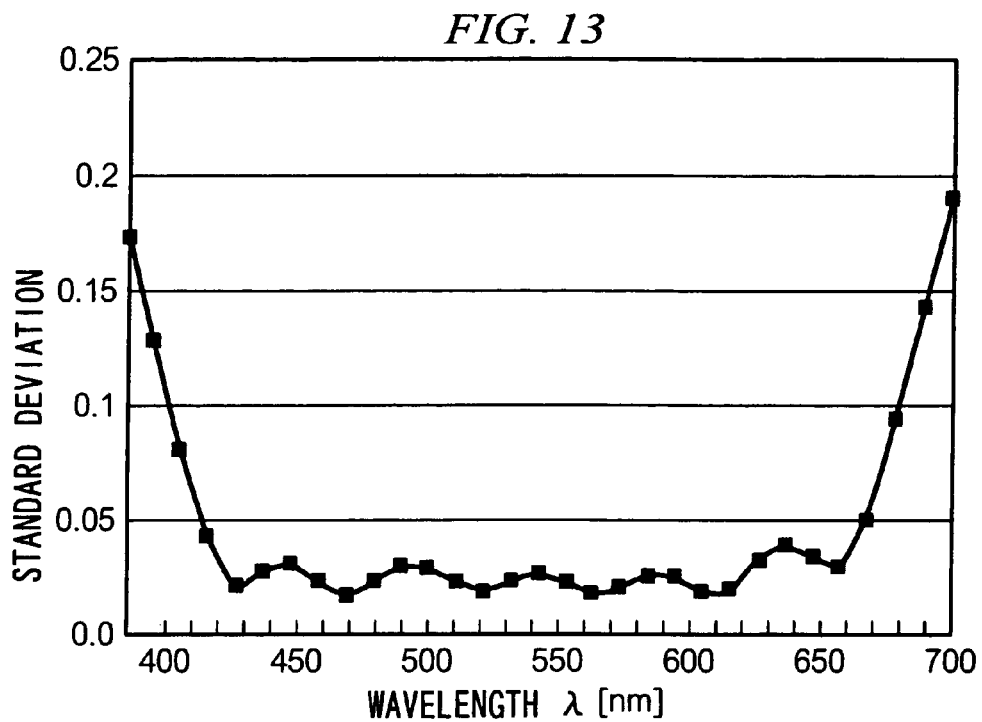
FIG. 13 is a diagram representing the difference between the spectral reflectances represented by the interpolation function $\rho(\lambda)$ and the original spectral reflectances of the object as standard deviation.

FIG. 11 illustrates an example of a particular object, but if the difference between the spectral reflectance estimation function $\rho_1(\lambda)$ calculated in the same manner as described above and the original spectral reflectances of objects is obtained for 1,000 various objects, there will be a difference of approximately 8% between the two, as shown in FIG. 12. It should be noted that the number of samples of the object is plotted against the X-axis in FIG. 12, and the ratio of difference between the two is plotted against the Y-axis. Furthermore, the difference between the two is expressed as standard deviation in FIG. 13. As can be appreciated from FIG. 13, the difference between the two increases in the short-wavelength region and long-wavelength region of the wavelength range used to extract the spectral reflectances.

As a result, the present inventors have developed the following hypothesis as to the cause of the increased difference between the spectral reflectance estimation function $\rho_1(\lambda)$ and the original spectral reflectances of the object in the short-wavelength region and long-wavelength region.

Figure 14:
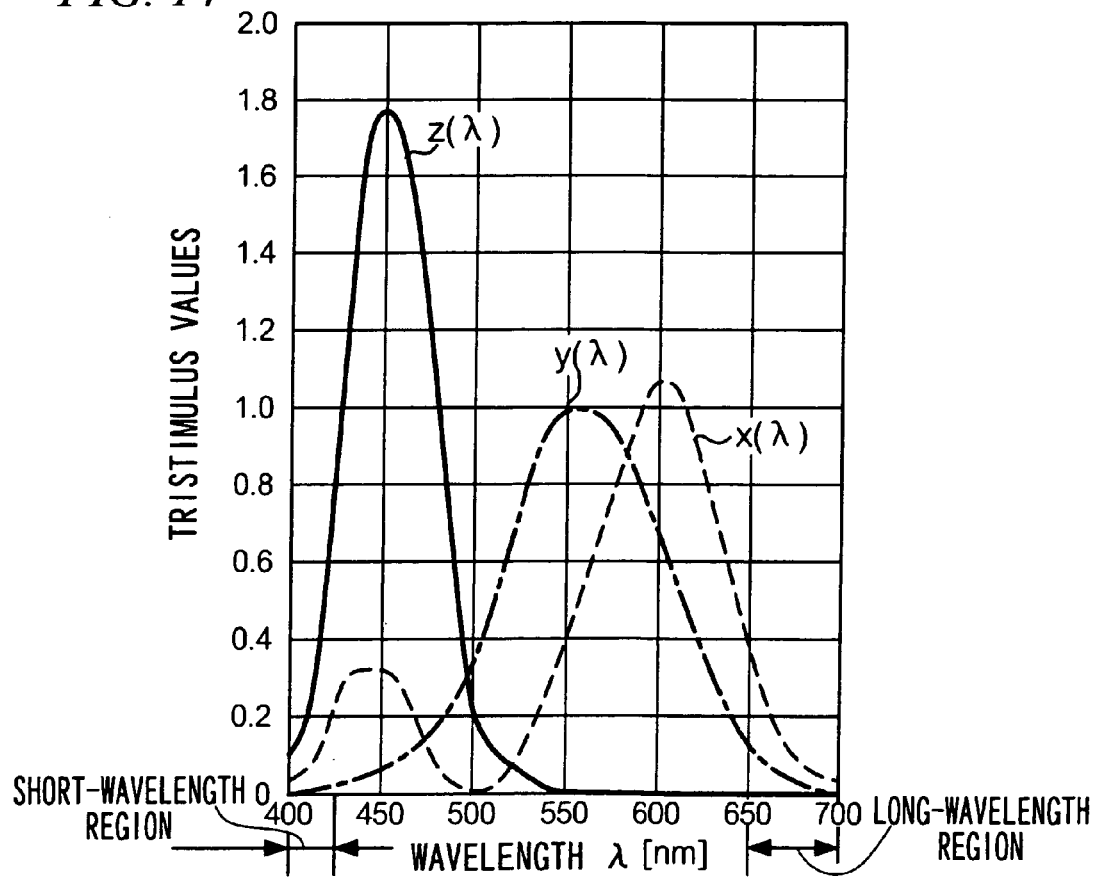
FIG. 14 is a diagram illustrating the relationship between the tristimulus values of the XYZ color system and wavelength.

FIG. 14 represents a relationship between the wavelength and the stimulus values of the XYZ color system. The wavelength $\lambda$ is plotted against the X-axis and the stimulus values $x(\lambda)$, $y(\lambda)$, and $z(\lambda)$, versus wavelength $\lambda$, are plotted against the Y-axis. Because the stimulus values $x(\lambda)$, $y(\lambda)$, and $z(\lambda)$ represent a putative numerical expression of the stimuli of the human eye, as shown in FIG. 14, they cover the entire 400 to 700 nm wavelength range, which includes the wavelength range of visible light. Incidentally, in the short-wavelength region of about 400 to 430 nm and in the long-wavelength region of about 650 to 700 nm (or about 660 to 700 nm), the values of the stimulus values $x(\lambda)$, $y(\lambda)$, and $z(\lambda)$ are small. In other words, in the XYZ color system, the ratios of contribution of the stimulus values $x(\lambda)$, $y(\lambda)$, and $z(\lambda)$ to the short-wavelength region and long-wavelength region are smaller than the ratios of contribution of the stimulus values $x(\lambda)$, $y(\lambda)$, and $z(\lambda)$ to other wavelength regions (medium wavelength region). On the other hand, if the spectral reflectance estimation function $\rho_1(\lambda)$ is determined in accordance with the method of the first exemplary embodiment and an attempt is made to faithfully reproduce the color of the object (its color as it appears to the human eye), as a result of the small contribution of the stimulus values $x(\lambda)$, $y(\lambda)$, and $z(\lambda)$ to the short-wavelength region and long-wavelength region, as described above, although it is possible to faithfully reproduce the color of the object (its color as it appears to the human eye) in the short-wavelength region and long-wavelength region, the values of the stimulus values $x(\lambda)$, $y(\lambda)$, and $z(\lambda)$ will not necessarily be accurate in the short-wavelength region and long-wavelength region.

It is believed that this is the reason for the increased difference between the spectral reflectance estimation function $\rho_1(\lambda)$ and the original spectral reflectances of the object in the short-wavelength region and long-wavelength region.

Figure 15:
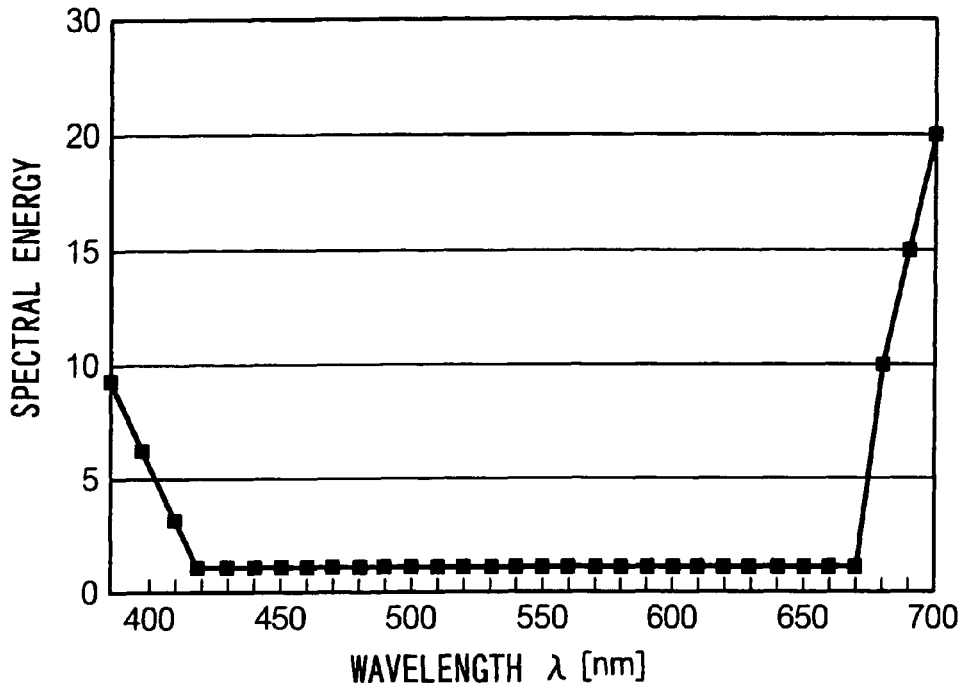
FIG. 15 is a diagram illustrating the spectral energy distribution of the virtual light source.

Accordingly, the second exemplary embodiment contemplates a case, where a virtual light source possessing a particular spectral energy distribution is imagined and illuminating light from said light source is used to illuminate the object. For this reason, only one light source among the first light source and second light source used in the first exemplary embodiment is necessary and the other one is not. It should be noted that, among the first light source and second light source, the second exemplary embodiment uses the first light source. The spectral energy distribution of the virtual light source (hereinafter referred to as the "virtual light source") possesses a distribution characteristic that compensates for the small contribution ratio of the stimulus values X, Y, and Z in the short-wavelength region and long-wavelength region described above. The present inventors conducted numerous experiments dealing with light sources of various spectral energy distributions and found spectral energies at which the difference between the spectral reflectances represented by the spectral reflectance estimation function $\rho(\lambda)$ and the original spectral reflectances of the object becomes smaller. Specifically, as shown in FIG. 15, in the visible light range, spectral energy is low in the intermediate wavelength range of 430 to 660 nm, and, on the other hand, spectral energy is high in the short-wavelength region of 400 to 430 nm and in the long-wavelength region of 660 to 700 nm. Furthermore, the spectral energy of the long-wavelength region is higher than the spectral energy of the short-wavelength region.

In the second exemplary embodiment, color descriptor values are determined based on the spectral reflectances extracted from the image data and optimal factors $w_j$ (j=1 to 6) are calculated from the relationship between the color descriptor values and the spectral reflectance estimation function for spectral reflectances represented by formula (1). The optimal factors $w_j$ can be calculated from the following formulas (11) through (16).

Formula 4

$$X_{D65} = \sum_{j=1}^{6} w_j \int_{vis} e_j(\lambda) \cdot E_{65}(\lambda) \cdot \bar{x}(\lambda) d\lambda \quad (11)$$

$$Y_{D65} = \sum_{j=1}^{6} w_j \int_{vis} e_j(\lambda) \cdot E_{65}(\lambda) \cdot \bar{y}(\lambda) d\lambda \quad (12)$$

$$Z_{D65} = \sum_{j=1}^{6} w_j \int_{vis} e_j(\lambda) \cdot E_{65}(\lambda) \cdot \bar{z}(\lambda) d\lambda \quad (13)$$

-continued $$X_V = \sum_{j=1}^{6} w_j \int_{vis} e_j(\lambda) \cdot E_V(\lambda) \cdot \bar{x}(\lambda) d\lambda \quad (14)$$

$$Y_V = \sum_{j=1}^{6} w_j \int_{vis} e_j(\lambda) \cdot E_V(\lambda) \cdot \bar{y}(\lambda) d\lambda \quad (15)$$

$$Z_V = \sum_{j=1}^{6} w_j \int_{vis} e_j(\lambda) \cdot E_V(\lambda) \cdot \bar{z}(\lambda) d\lambda \quad (16)$$

In addition, in the same manner as in the first exemplary embodiment, formulas (11) through (13) represent relationships between tristimulus values $X_{D65}$, $Y_{D65}$, and $Z_{D65}$ determined from scanning operations (the first scanning operation) using illuminant $D_{65}$ and the values of the spectral reflectance estimation function for spectral reflectances $\rho(\lambda)$. In addition, formulas (14) through (16) represent relationships between tristimulus values Xv, Yv, and Zv and the values of the spectral reflectance estimation function for spectral reflectances $\rho(\lambda)$. If $E_{65}(\lambda)$ represents the spectral energy distribution of the first light source 131 and $Ev(\lambda)$ represents the spectral energy distribution of the virtual light source shown in FIG. 15, then the tristimulus values Xv, Yv, and Zv in formulas (14) to (16) are obtained by multiplying $Ev(\lambda)/E_{65}(\lambda)$ by the tristimulus values $X_{D65}$, $Y_{D65}$, and $Z_{D65}$ determined from the scanning operations using illuminant $D_{65}$. It should be noted that the word "vis" in formulas (11) through (16) represents the wavelength region where the spectral reflectances were extracted, in this case, 400 nm to 700 nm.

When the respective 31 spectral reflectances are extracted from the first image data, the tristimulus values $X_{D65}$, $Y_{D65}$, $Z_{D65}$ are determined based on the reflectances. Furthermore, tristimulus values Xv, Yv, and Zv are obtained by multiplying $Ev(\lambda)/E_{65}(\lambda)$ by the tristimulus values $X_{D65}$, $Y_{D65}$, $Z_{D65}$. At this point formulas (11) to (16) become $6^{th}$-order linear equations where the six factors $w_1$ to $w_6$ are unknown values and, therefore, the unique values of the factors $w_1$ to $w_6$ can be calculated.

By doing so, as shown in the lower portion of FIG. 12, the difference between the spectral reflectances represented by the spectral reflectance estimation function $\rho(\lambda)$ and the original spectral reflectances of the object, as determined for 1,000 various objects, is kept within 4%.

Figure 16:
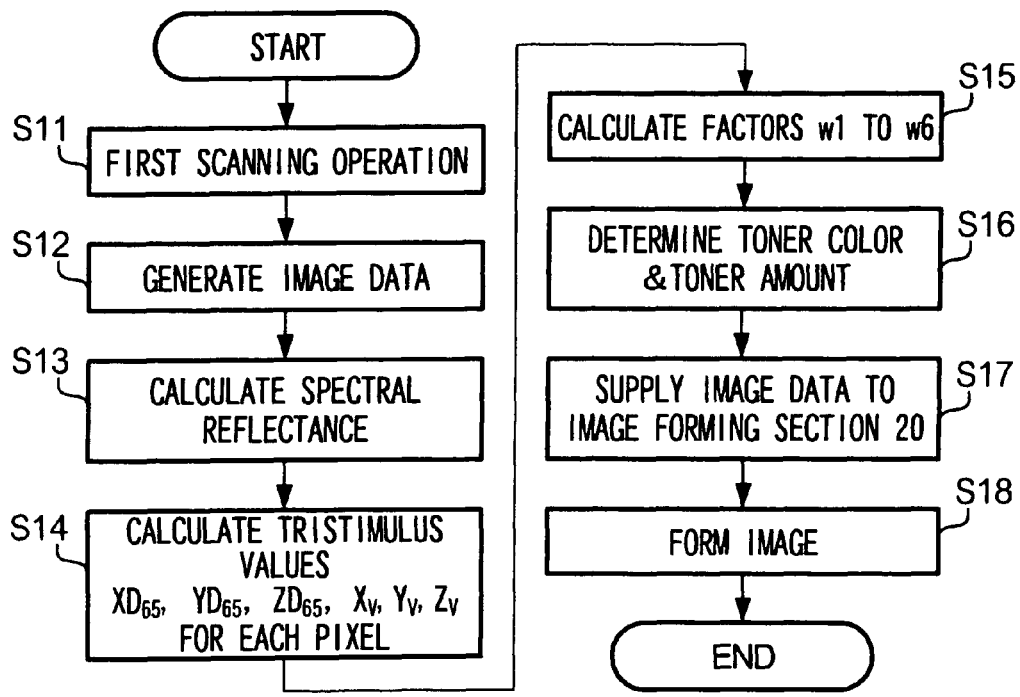
FIG. 16 is a flow chart illustrating the sequence of operations of the image forming apparatus according to a second exemplary embodiment.

FIG. 16 is a flow chart showing a sequence of operations that are carried out, in which the image forming apparatus 1 of the second exemplary embodiment performs the operation of scanning the object O and forms an image on printing paper P.

In FIG. 10, when the object to be imaged O is placed on the platen glass 11 and the operator issues an instruction to start image forming, the controller 30 causes the image reading section 10 to execute the first scanning operation by illuminating the object to be imaged O with light from the first light source 131 (Step S11). The controller 30 then supplies the generated image signal to the image processing section 50, causing it to generate image data (Step S12). Next, the controller 30 causes the image processing section 50 to calculate spectral reflectances for individual pixels forming part of the image data (Step S13). More specifically, 31 spectral reflectances are calculated per pixel by setting the wavelength interval to δ=10 nm in the wavelength region of from 400 nm to 700 nm.

Subsequently, the controller 30 then causes the image processing section 50 to calculate the tristimulus values of the XYZ color system $X_{D65}$, $Y_{D65}$, $Z_{D65}$, and Xv, Yv, Zv for each individual pixel of the first and second image data based on the spectral reflectances calculated in Step S13 (Step S14). The controller 30 then causes the image processing section 50 to calculate factors $w_1$ to $w_6$ in order to calculate the spectral reflectance estimation function for spectral reflectances $\rho(\lambda)$ for the image data representing the object O (Step S15).

Subsequently, the controller 30 causes the image processing section 50 to carry out color space processing and screen processing on the image data to determine the amount and color of the toner assigned to areas corresponding to the pixels of the image data (Step S16).

When determining the amounts of the toners, the controller 30 identifies, for each pixel, the proportions of the toners (colorants) of each color, such as cyan, magenta, yellow, black, red, orange, green, and blue, area ratios, and dot shapes, etc. for the color represented by the spectral reflectance estimation function for spectral reflectances $\rho(\lambda)$, which is determined by the factors $w_1$ to $w_6$. Furthermore, depending on the image described by the image data, the controller 30 may determine whether to use transparent toner. For example, when the number of utilized toner colors is small, such as when the image data is monochromatic document data, etc., the controller 30 sets the toner amount for transparent toner to zero for such image data. Moreover, when the image data is polychromatic and the number of utilized toner colors increases, the controller 30 applies a predetermined amount of the transparent toner over the entire area of the image data.

The controller 30 supplies image data including information on the proportions of toner of each color in each pixel, area ratios and dots, etc. to the image forming section 20 (Step S17). In accordance with the image data, the image forming section 20 uses a set of toners to form an image on the printing sheet P (Step S18).

Specifically, the image forming section 20 selects the primary transfer units 23 corresponding to the image data of each color and forms latent electrostatic images corresponding to the image data therein. After that, the image forming section 20 selects the developing units of the toner color indicated by the image data and applies toner to the latent electrostatic images to form toner images. Once the toner images of various colors have been formed by doing so and once the primary transfer thereof onto the intermediate transfer belt 24 has been carried out, the image forming section 20 carries out secondary transfer of the toner images onto the sheet, fixes the images using the primary fixing mechanism 27 and secondary fixing mechanism 29, and ejects the sheet. This produces a copy, i.e. an image representing the object O, and the image forming process is terminated.

The exemplary embodiment explained above is the second exemplary embodiment.

It should be noted that the above-described first and second exemplary embodiments may be modified in the following manner. Additionally, the individual modifications described below can also be combined as appropriate.

Although the exemplary embodiments describe an exemplary image processing section 50 incorporated into an image forming apparatus 1, the image processing section is not limited to sections incorporated into an image forming apparatus and, for example, may be incorporated into a scanning device for image reading or incorporated into a computer carrying out image processing. In such a case, the image processing apparatus outputs the factors determined in the above-described fashion to e.g. the image forming apparatus and recordable media, etc. On the other hand, the image forming apparatus, as well as information processors reading the factors from the recordable media, obtain a spectral reflectance estimation function for spectral reflectances representing colors by forming a linear combination of the factors and stored eigenvectors. Furthermore, the amounts of the colorants used for representing the colors expressed by the function may be calculated and images may be formed on printing materials using the calculated amounts of the colorants. In such a case, the amount of data can also be reduced in comparison with the conventional practice of handling a large number of spectral reflectances. Accordingly, in comparison with cases, in which spectral reflectances are outputted to the image forming apparatus and recordable media, etc. as image data, the amount of time required for output can be reduced and the amount of data stored on the recordable media can be made smaller. It should be noted that when an image processing apparatus outputs data to an image forming apparatus, the image processing apparatus calculates the respective amounts of the colorants used for representing the color expressed by the function represented by a linear combination of the factors and eigenvectors, and, instead of outputting factors, or factors along with color descriptor values, may be set up to output colorant amounts.

In addition, although explanations provided in the exemplary embodiments are concerned with an exemplary image reading apparatus 10 incorporated into the image forming apparatus 1, the image reading apparatus is not limited to apparatuses incorporated into an image forming apparatus and, for example, it may be an apparatus separate from the image forming apparatus.

In addition, when the above-described image processing apparatus supplies factors and tristimulus values to an external image forming apparatus or information processor, it may acquire information related to the destination apparatus and supply only data whose content matches said apparatus. For example, if it is possible for the destination apparatus to obtain a spectral reflectance estimation function for spectral reflectances using a linear combination of factors and eigenvectors, the image processing apparatus may be set up to supply factors or factors and tristimulus values. In such a case the destination apparatus can obtain a spectral reflectance estimation function for spectral reflectances and reproduce the color, and the user can visually recognize the tristimulus values and determine the color.

On the other hand, when the destination apparatus cannot obtain a spectral reflectance estimation function for spectral reflectances even if the factors are supplied, such as when it does not store eigenvectors, the image processing apparatus may be set up to supply tristimulus values alone. By doing so, the destination apparatus can reproduce the color from the tristimulus values without having to receive the unnecessary factors, which makes the operations more efficient. Quite naturally, the image processing apparatus may supply the factors along with the tristimulus values to allow the destination apparatus to determine which of them is used in reproducing the color.

In other words, it will be able to reproduce the colors of the image regardless of whether the apparatus has the prescribed specifications.

Moreover, while the explanations provided in the exemplary embodiments uses the first light source 131 as a light source emitting light conforming to standard illuminant $D_{65}$ and the second light source 132 as a light source emitting light conforming to standard illuminant A, if the spectral energy distributions of the first light source and second light source are different in the wavelength range where the spectral reflectance estimation function for spectral reflectances is obtained, any type of light source may be used. Because the number of tristimulus values obtained based on the spectral reflectances extracted from the image data is 6 regardless of the type of the light source, it matches the number of eigenvectors, which is 6 as well, and the factors can be uniquely calculated from the relationship between the tristimulus values and eigenvectors, such as in formulas (2) through (7) and (11) through (16).

Moreover, although the number of the eigenvectors is set to 6 in the exemplary embodiments, it is not limited to this number and can be set in an arbitrary fashion. As shown in the above-described FIG. 6, the more the number of the eigenvectors increases, the greater the improvement in terms of the cumulative contribution ratio with respect to the population, and the greater the improvement in the accuracy of the spectral reflectance estimation function for spectral reflectances. For example, if the number of the eigenvectors is set to 9, the cumulative contribution rate will get even closer to 100%. Incidentally, in order to uniquely calculate nine factors, a $9^{th}$ order linear equation will be required for the tristimulus values. In other words, nine different tristimulus values will have to be obtained. That is, it will be necessary to conduct the scanning operation using three different light sources and, more specifically, in addition to the first and second scanning operation, a third scanning operation will be carried out using a light source which, for example, emits light conforming to an auxiliary standard illuminant $D_{50}$. By doing so, it will become possible to uniquely calculate all the factors from the spectral reflectance estimation function for spectral reflectances and the nine different tristimulus values.

In addition, although in the exemplary embodiments the image forming apparatus 1 is set up to supply the tristimulus values in the XYZ color system along with factors associated with the eigenvectors, the type of the supplied tristimulus values may be determined as desired. For example, even if the supplied values are only the tristimulus values $X_{D65}$, $Y_{D65}$, $Z_{D65}$ obtained from the first scanning operation, or when they are only the tristimulus values $X_A$, $Y_A$, and $Z_A$ obtained from the second scanning operation, it is still possible to determine the color under certain conditions from the tristimulus values. In addition, the number may be even smaller.

Moreover, although in the exemplary embodiments the image forming apparatus 1 uses tristimulus values in the XYZ color system as the color descriptor values, CIELAB color space colorimetric values may be used as well. The tristimulus values in the XYZ color system are suitable for determining colors under certain observation conditions but they are not convenient for clearly expressing differences between colors. Accordingly, since the use of CIELAB color space colorimetric values allows for quantiying differences between colors, they will be convenient to use in case one has to determine fine color differences. In addition, a method can be used, where factors are obtained using the tristimulus values of the XYZ color system and then, if necessary, conversion to the colorimetric values of the CIELAB color space is performed. In addition, color descriptor values in other color spaces, such as the CIELUV color space, may be used as well.

Moreover, although in the exemplary embodiments toner images are formed using a transparent toner and eight color toners, such as cyan, magenta, yellow, black, red, orange, green, and blue, the colors used in the present invention are not limited to such examples. An arbitrary number of toners from among these toners may be stored and developed in the image forming apparatus.

Although in the exemplary embodiments the number of photodetector lines in the line sensor is 31, it may be both smaller and larger than that. However, since the intention is to read using more colors than the three conventional colors, i.e. R, G, and B, there have to be at least 4, or more, photodetector lines. In addition, it is possible to use a system with a single photodetector row, in which a set of color filters is used and the object is read several times while switching the color filters used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a first calculation section that calculates a plurality of spectral reflectances at a plurality of wavelengths based on intensities of light illuminating an object and reflected from the object, the light having a certain spectral energy distribution;
a second calculation section that calculates color descriptor values of the object based on the spectral reflectances calculated by the first calculation section;
a third calculation section that calculates a set of factors when a color of the object is expressed using a set of color descriptor values generated based on the color descriptor values calculated by the second calculation section, each of the set of the color descriptor values expressed by a linear combination of a plurality of eigenvectors, the factors each associated with the respective eigenvectors, and either spectral energy of a reference light from a light source or theoretical spectral energy of a virtual light; and
an output section that outputs the factors calculated by the third calculation section; and
wherein the following equations are satisfied:

$$X_{D65} = \sum_{j=1}^{6} w_j \int_{vis} e_j(\lambda) \cdot E_{65}(\lambda) \cdot \bar{x}(\lambda) d\lambda$$

$$Y_{D65} = \sum_{j=1}^{6} w_j \int_{vis} e_j(\lambda) \cdot E_{65}(\lambda) \cdot \bar{y}(\lambda) d\lambda$$

$$Z_{D65} = \sum_{j=1}^{6} w_j \int_{vis} e_j(\lambda) \cdot E_{65}(\lambda) \cdot \bar{z}(\lambda) d\lambda$$

$$X_V = \sum_{j=1}^{6} w_j \int_{vis} e_j(\lambda) \cdot E_V(\lambda) \cdot \bar{x}(\lambda) d\lambda$$

$$Y_V = \sum_{j=1}^{6} w_j \int_{vis} e_j(\lambda) \cdot E_V(\lambda) \cdot \bar{y}(\lambda) d\lambda$$

$$Z_V = \sum_{j=1}^{6} w_j \int_{vis} e_j(\lambda) \cdot E_V(\lambda) \cdot \bar{z}(\lambda) d\lambda$$

wherein $w_1$-$w_6$ are the set of factors,
$X_{D65}$, $Y_{D65}$, $Z_{D65}$, $X_V$, $Y_V$, $Z_Z$ are the set of color descriptor values, $e_1(\lambda)$ to $e_6(\lambda)$ are the plurality of eigenvectors, $E_{65}$ is a spectral energy of a reference light from a light source, and $E_v$ is a theoretical spectral energy of a virtual light.

2. The image processing apparatus according to claim 1, wherein the theoretical spectral energy of the virtual light is relatively substantially large in a short-wavelength region and a long-wavelength region as compared to another wavelength region within a wavelength range of visible light.

3. The image processing apparatus according to claim 2, wherein the theoretical spectral energy of the long-wavelength region is substantially higher than the theoretical spectral energy of the short-wavelength region.

4. The image processing apparatus according to claim 1, further comprising:

a colorant calculation section that calculates amounts of a plurality of colorants used to express a color, the color represented by a linear combination of the factors and the eigenvectors, wherein the output section, instead of outputting the factors, outputs the colorant amounts calculated by the colorant calculation section.

5. The image processing apparatus according to claim 1, wherein a number of the eigenvectors is six.

6. An image reading apparatus comprising:

a light source that illuminates an object with a light having a certain spectral energy distribution;

a first calculation section that calculates a plurality of spectral reflectances at a plurality of wavelengths based on intensities of light irradiating an object and reflected from the object, the light having a certain spectral energy distribution;

a second calculation section that calculates color descriptor values of the object based on the spectral reflectances calculated by the first calculation section;

a third calculation section that calculates a set of factors when a color of the object is expressed using a set of color descriptor values generated based on the color descriptor values calculated by the second calculation section, each of the set of the color descriptor values expressed by a linear combination of a plurality of eigenvectors, the factors each associated with the respective eigenvectors, and either spectral energy of a reference light from a light source or theoretical spectral energy of a virtual light; and an output section that outputs the factors calculated by the factor calculation section;

wherein the following equations are satisfied:

$$X_{D65} = \sum_{j=1}^{6} w_j \int_{vis} e_j(\lambda) \cdot E_{65}(\lambda) \cdot \bar{x}(\lambda) d\lambda$$

$$Y_{D65} = \sum_{j=1}^{6} w_j \int_{vis} e_j(\lambda) \cdot E_{65}(\lambda) \cdot \bar{y}(\lambda) d\lambda$$

$$Z_{D65} = \sum_{j=1}^{6} w_j \int_{vis} e_j(\lambda) \cdot E_{65}(\lambda) \cdot \bar{z}(\lambda) d\lambda$$

$$X_V = \sum_{j=1}^{6} w_j \int_{vis} e_j(\lambda) \cdot E_V(\lambda) \cdot \bar{x}(\lambda) d\lambda$$

-continued $$Y_V = \sum_{j=1}^{6} w_j \int_{vis} e_j(\lambda) \cdot E_V(\lambda) \cdot \bar{y}(\lambda) d\lambda$$

$$Z_V = \sum_{j=1}^{6} w_j \int_{vis} e_j(\lambda) \cdot E_V(\lambda) \cdot \bar{z}(\lambda) d\lambda$$

wherein $w_1$-$w_6$ are the set of factors, $X_{D65}, Y_{D65}, Z_{D65}, X_V, Y_V, Z_Z$ are the set of color descriptor values, $e_1(\lambda)$ to $e_6(\lambda)$ are the plurality of eigenvectors, $E_{65}$ is a spectral energy of a reference light from a light source, and $E_v$ is a theoretical spectral energy of a virtual light.

7. An image forming apparatus comprising:

a light source that illuminates an object with a light having a certain spectral energy distribution;

a first calculation section that calculates a plurality of spectral reflectances at a plurality of wavelengths based on intensities of light irradiating an object and reflected from the object, the light having a certain spectral energy distribution;

a second calculation section that calculates color descriptor values of the object based on the spectral reflectances calculated by the first calculation section;

a third calculation section that calculates a set of factors when a color of the object is expressed using a set of color descriptor values generated based on the color descriptor values calculated by the second calculation section, each of the set of the color descriptor values expressed by a linear combination of a plurality of eigenvectors, the factors each associated with the respective eigenvectors, and either spectral energy of a reference light from a light source or theoretical spectral energy of a virtual light;

a colorant calculation section that calculates amounts of a plurality of colorants used to express a color, the color represented by a linear combination of the factors and the eigenvectors; and an image forming unit that forms an image on a printing material using the colorants in the amounts determined by the colorant calculation section; and wherein the following equations are satisfied:

$$X_{D65} = \sum_{j=1}^{6} w_j \int_{vis} e_j(\lambda) \cdot E_{65}(\lambda) \cdot \bar{x}(\lambda) d\lambda$$

$$Y_{D65} = \sum_{j=1}^{6} w_j \int_{vis} e_j(\lambda) \cdot E_{65}(\lambda) \cdot \bar{y}(\lambda) d\lambda$$

$$Z_{D65} = \sum_{j=1}^{6} w_j \int_{vis} e_j(\lambda) \cdot E_{65}(\lambda) \cdot \bar{z}(\lambda) d\lambda$$

$$X_V = \sum_{j=1}^{6} w_j \int_{vis} e_j(\lambda) \cdot E_V(\lambda) \cdot \bar{x}(\lambda) d\lambda$$

$$Y_V = \sum_{j=1}^{6} w_j \int_{vis} e_j(\lambda) \cdot E_V(\lambda) \cdot \bar{y}(\lambda) d\lambda$$

$$Z_V = \sum_{j=1}^{6} w_j \int_{vis} e_j(\lambda) \cdot E_V(\lambda) \cdot \bar{z}(\lambda) d\lambda$$

wherein $w_1$-$w_6$ are the set of factors,
$X_{D65}, Y_{D65}, Z_{D65}, X_V, Y_V, Z_Z$ are the set of color descriptor values,
$e_1(\lambda)$ to $e_6(\lambda)$ are the plurality of eigenvectors,
$E_{65}$ is a spectral energy of a reference light from a light source, and
$E_v$ is a theoretical spectral energy of a virtual light.

8. An image processing method comprising:
calculating a plurality of spectral reflectances at a plurality of wavelengths based on intensities of light illuminating an object and reflected from the object, the light having a certain spectral energy distribution;
calculating color descriptor values of the object based on the spectral reflectances;
calculating a set of factors when a color of the object is expressed using a set of color descriptor values generated based on the color descriptor values, each of the set of the color descriptor values expressed by a linear combination of a plurality of eigenvectors, the factors each associated with the respective eigenvectors, and either spectral energy of a reference light from a light source or theoretical spectral energy of a virtual light; and
outputting the factors; and
wherein the following equations are satisfied:

$$X_{D65} = \sum_{j=1}^{6} w_j \int_{vis} e_j(\lambda) \cdot E_{65}(\lambda) \cdot \bar{x}(\lambda) d\lambda$$

$$Y_{D65} = \sum_{j=1}^{6} w_j \int_{vis} e_j(\lambda) \cdot E_{65}(\lambda) \cdot \bar{y}(\lambda) d\lambda$$

$$Z_{D65} = \sum_{j=1}^{6} w_j \int_{vis} e_j(\lambda) \cdot E_{65}(\lambda) \cdot \bar{z}(\lambda) d\lambda$$

$$X_V = \sum_{j=1}^{6} w_j \int_{vis} e_j(\lambda) \cdot E_V(\lambda) \cdot \bar{x}(\lambda) d\lambda$$

$$Y_V = \sum_{j=1}^{6} w_j \int_{vis} e_j(\lambda) \cdot E_V(\lambda) \cdot \bar{y}(\lambda) d\lambda$$

$$Z_V = \sum_{j=1}^{6} w_j \int_{vis} e_j(\lambda) \cdot E_V(\lambda) \cdot \bar{z}(\lambda) d\lambda$$

wherein $w_1$-$w_6$ are the set of factors,
$X_{D65}, Y_{D65}, Z_{D65}, X_V, Y_V, Z_Z$ are the set of color descriptor values,
$e_1(\lambda)$ to $e_6(\lambda)$ are the plurality of eigenvectors,
$E_{65}$ is a spectral energy of a reference light from a light source, and
$E_v$ is a theoretical spectral energy of a virtual light.

9. An image reading method comprising:
illuminating an object with a light having a certain spectral energy distribution;
calculating a plurality of spectral reflectances at a plurality of wavelengths based on intensities of light irradiating an object and reflected from the object, the light having a certain spectral energy distribution;
calculating color descriptor values of the object based on the spectral reflectances;
calculating a set of factors when a color of the object is expressed using a set of color descriptor values generated based on the color descriptor values, each of the set of the color descriptor values expressed by a linear combination of a plurality of eigenvectors, the factors each associated with the respective eigenvectors, and either spectral energy of a reference light from a light source or theoretical spectral energy of a virtual light; and
outputting the factors; and
wherein the following equations are satisfied:

$$X_{D65} = \sum_{j=1}^{6} w_j \int_{vis} e_j(\lambda) \cdot E_{65}(\lambda) \cdot \bar{x}(\lambda) d\lambda$$

$$Y_{D65} = \sum_{j=1}^{6} w_j \int_{vis} e_j(\lambda) \cdot E_{65}(\lambda) \cdot \bar{y}(\lambda) d\lambda$$

$$Z_{D65} = \sum_{j=1}^{6} w_j \int_{vis} e_j(\lambda) \cdot E_{65}(\lambda) \cdot \bar{z}(\lambda) d\lambda$$

$$X_V = \sum_{j=1}^{6} w_j \int_{vis} e_j(\lambda) \cdot E_V(\lambda) \cdot \bar{x}(\lambda) d\lambda$$

$$Y_V = \sum_{j=1}^{6} w_j \int_{vis} e_j(\lambda) \cdot E_V(\lambda) \cdot \bar{y}(\lambda) d\lambda$$

$$Z_V = \sum_{j=1}^{6} w_j \int_{vis} e_j(\lambda) \cdot E_V(\lambda) \cdot \bar{z}(\lambda) d\lambda$$

wherein $w_1$-$w_6$ are the set of factors,
$X_{D65}, Y_{D65}, Z_{D65}, X_V, Y_V, Z_Z$ are the set of color descriptor values,
$e_1(\lambda)$ to $e_6(\lambda)$ are the plurality of eigenvectors,
$E_{65}$ is a spectral energy of a reference light from a light source, and
$E_v$ is a theoretical spectral energy of a virtual light.

10. An image forming method comprising:
illuminating an object with a light having a certain spectral energy distribution;
calculating a plurality of spectral reflectances at a plurality of wavelengths based on intensities of light irradiating an object and reflected from the object, the light having a certain spectral energy distribution;
calculating color descriptor values of the object based on the spectral reflectances;
calculating a set of factors when a color of the object is expressed using a set of color descriptor values generated based on the color descriptor values, each of the set of the color descriptor values expressed by a linear combination of a plurality of eigenvectors, the factors each associated with the respective eigenvectors, and either spectral energy of a reference light from a light source or theoretical spectral energy of a virtual light;
calculating amounts of a plurality of colorants used to express a color, the color represented by a linear combination of the factors and the eigenvectors; and
forming an image on a printing material using the colorants in the amounts; and
wherein the following equations are satisfied:

$$X_{D65} = \sum_{j=1}^{6} w_j \int_{vis} e_j(\lambda) \cdot E_{65}(\lambda) \cdot \bar{x}(\lambda) d\lambda$$

$$Y_{D65} = \sum_{j=1}^{6} w_j \int_{vis} e_j(\lambda) \cdot E_{65}(\lambda) \cdot \bar{y}(\lambda) d\lambda$$

$$Z_{D65} = \sum_{j=1}^{6} w_j \int_{vis} e_j(\lambda) \cdot E_{65}(\lambda) \cdot \bar{z}(\lambda) d\lambda$$

-continued $$X_V = \sum_{j=1}^{6} w_j \int_{vis} e_j(\lambda) \cdot E_V(\lambda) \cdot \bar{x}(\lambda) \, d\lambda$$

$$Y_V = \sum_{j=1}^{6} w_j \int_{vis} e_j(\lambda) \cdot E_V(\lambda) \cdot \bar{y}(\lambda) \, d\lambda$$

$$Z_V = \sum_{j=1}^{6} w_j \int_{vis} e_j(\lambda) \cdot E_V(\lambda) \cdot \bar{z}(\lambda) \, d\lambda$$

wherein $w_1$-$w_6$ are the set of factors, $X_{D65}, Y_{D65}, Z_{D65}, X_V, Y_V, Z_Z$ are the set of color descriptor values, $e_1(\lambda)$ to $e_6(\lambda)$ are the plurality of eigenvectors, $E_{65}$ is a spectral energy of a reference light from a light source, and $E_v$ is a theoretical spectral energy of a virtual light.

* * * * *